(12) United States Patent
Davis et al.

(10) Patent No.: US 6,826,343 B2
(45) Date of Patent: Nov. 30, 2004

(54) MULTI-CORE WAVEGUIDE

(75) Inventors: Michael A. Davis, Glastonbury, CT (US); Timothy J. Bailey, Longmeadow, MA (US); Martin A. Putnam, Cheshire, CT (US); Mark R. Fernald, Enfield, CT (US)

(73) Assignee: CiDRA Corporation, Wallingford, CT (US)

( * ) Notice: Subject to any disclaimer, the term of this patent is extended or adjusted under 35 U.S.C. 154(b) by 194 days.

(21) Appl. No.: 10/098,925

(22) Filed: Mar. 16, 2002

(65) Prior Publication Data

US 2002/0146226 A1 Oct. 10, 2002

Related U.S. Application Data

(60) Provisional application No. 60/276,455, filed on Mar. 16, 2001.

(51) Int. Cl.[7] .............................. G02B 6/22; G02B 6/34; G02B 6/293
(52) U.S. Cl. ............................ 385/126; 385/37; 385/24
(58) Field of Search .............................. 385/24, 27, 30, 385/31, 37, 123–128

(56) References Cited

U.S. PATENT DOCUMENTS

| | | | | | |
|---|---|---|---|---|---|
| 5,016,967 A | * | 5/1991 | Meltz et al. | .................. | 385/37 |
| 5,459,801 A | | 10/1995 | Snitzer | | |
| 5,469,520 A | * | 11/1995 | Morey et al. | ................. | 385/37 |
| 5,778,119 A | | 7/1998 | Farries | | |

FOREIGN PATENT DOCUMENTS

| | | |
|---|---|---|
| DE | 19627756 | 1/1998 |
| EP | 0212954 | 3/1987 |
| EP | 0234828 | 9/1987 |
| EP | 0324541 | 7/1989 |
| EP | 0356951 | 3/1990 |
| EP | 0729043 | 8/1996 |
| FR | 2684454 | 6/1993 |
| JP | 03018804 | 1/1991 |
| WO | WO 9715851 | 5/1997 |
| WO | WO 9848305 | 10/1998 |
| WO | WO 0039617 | 7/2000 |
| WO | WO 0104676 | 1/2001 |

OTHER PUBLICATIONS

Oh K et al. Suppression of Cladding Mode Coupling in Bragg Grating Using GE20–B203 Codoped photosensitive cladding optical fibre, Electronics Letters, vol. 35, Mar. 1999, pp. 423,424.

Patent Abstracts of Japan, vol. 015, No. 140, Jan. 1991.

Weber, JP, "Spectral Characteristics Bragg reflection tunable optical filer", IEEE Proceedings, vol. 140, Oct. 1993, pp. 275–284.

Baumann et al, "Compact all fiber add drop multiplexer using fiber bragg gratings", IEEE Proceedings, vol. 8. Oct. 1996.

Bethuys et al. "Optical add'drop multiplexer based on UV–written bragg gratings in twincore fibre mach–zehnder interferometer". IEEE Electronics letter, vol. 34, Jun. 11, 1998.

* cited by examiner

Primary Examiner—Brian Healy
Assistant Examiner—Sarah Song

(57) ABSTRACT

An optical device is provided that includes an optical waveguide and a tuning device. The optical waveguide has an outer transverse dimension greater than about 0.3 millimeter (mm), and includes an outer cladding, and at least two cores disposed within the outer cladding, the at least two cores being spaced apart a predetermined distance to couple light from a first core to the other core. The tuning device provides a compressive force on the optical waveguide to couple one or more optical signals from one core to another core.

48 Claims, 17 Drawing Sheets

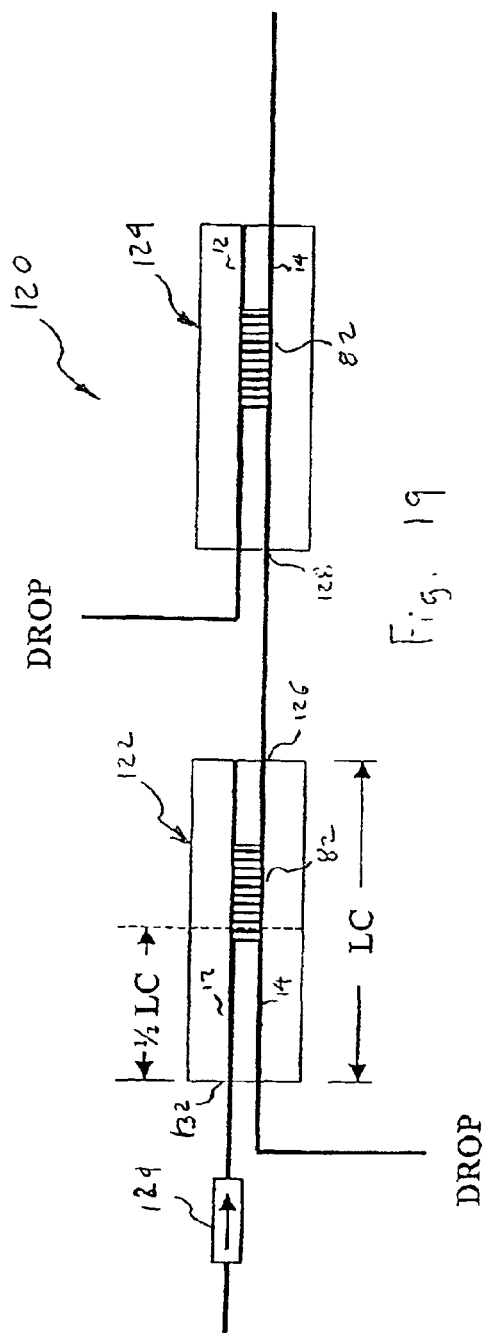
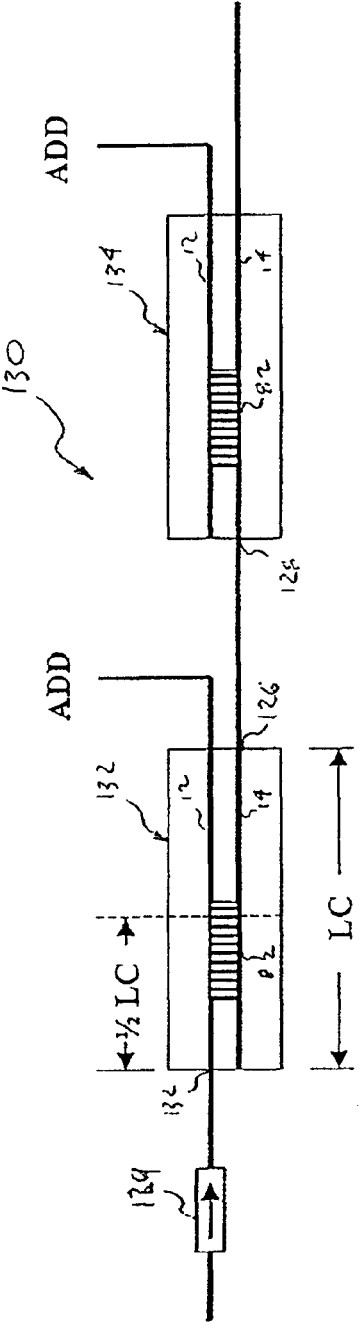
Fig. 19
Fig. 20

Coupling Region 1     Offset Core Wrapped in Helix Around Centered Core Creates Path Delay     Coupling Region 2

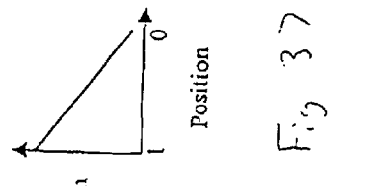
Fig 37
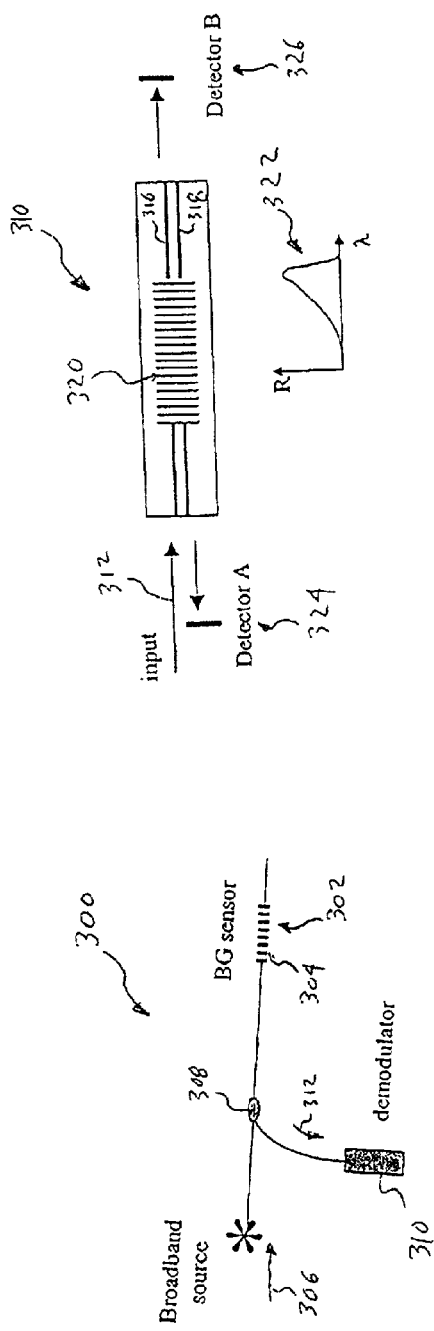
Fig. 34
Fig 36
Fig 33
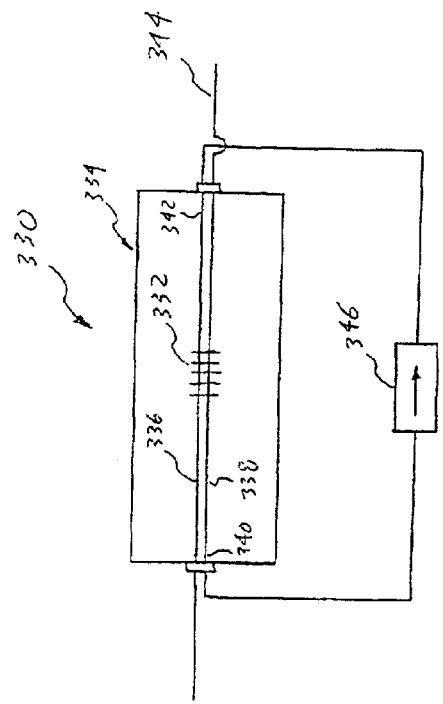
Fig 35

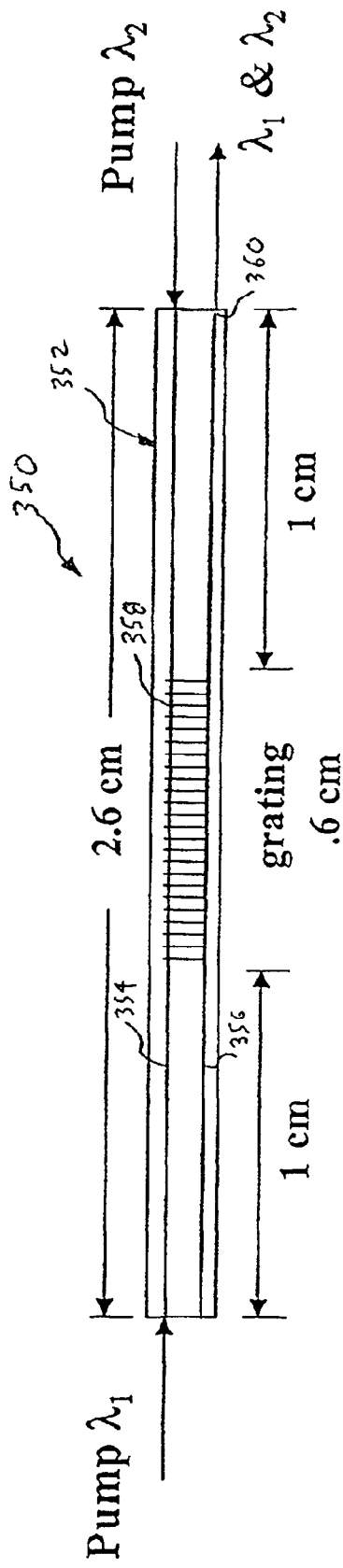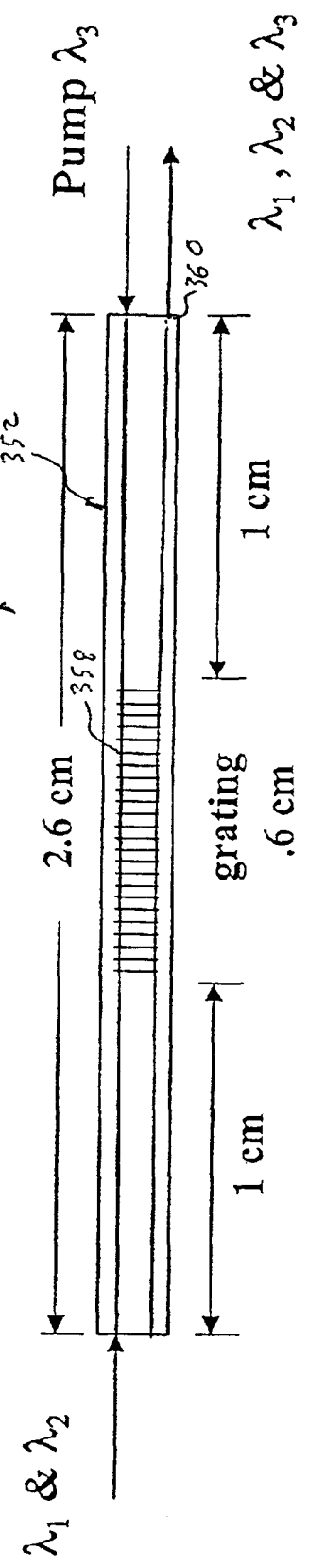
Fig. 38
Fig. 39

MULTI-CORE WAVEGUIDE

CROSS REFERENCE TO RELATED APPLICATIONS

This application claims the benefit of U.S. patent application Ser. No. 09/455,868, filed Dec. 12, 1999; U.S. patent application Ser. No. 09/455,865, filed December 1999, now granted (U.S. Pat. No. 6,519,388), which is a continuation-in-part of U.S. patent application Ser. No. 09/399,495, filed Sep. 20, 1999, now abandoned, which is continuation in part of U.S. patent application Ser. No. 09/205,943, filed Dec. 4, 1998, now abandon; U.S. application Ser. No. 09/707,084, filed Nov. 6, 2000, now abandoned, which is a continuation-in-part of U.S. Pat. No. 09/691,997, filed Oct. 19, 2000, now granted (U.S. Pat. No. 6,363,089), which is a continuation of U.S. patent application Ser. No. 09/456,112, filed Dec. 6, 1999, now granted (U.S. Pat. No. 6,229,827), which is a continuation-in-part of U.S. patent application Ser. No. 09/400,362 filed Sep. 20, 1999, now abandoned, which is a continuation-in-part of U.S. patent application Ser. No. 09/205,846, filed Dec. 4, 1998, now abandoned; U.S. application Ser. No. 09/699,940, filed Oct. 30, 2000 now granted (U.S. Pat. No. 6,621,957), which is a continuation-in-part of U.S. patent application Ser. No. 09/519,240, filed Mar. 6, 2000 now abandoned; and U.S. Provisional Application No. 60/276,455, filed Mar. 16, 2001; all of which are incorporated by reference in their entirety.

TECHNICAL FIELD

The present invention relates to a multi-core core optical waveguide, and more particularly to multi-core waveguide having a cladding disposed about at least a pair of inner cores and having an outer transverse dimension of at least 0.3 mm, which may include a Bragg grating written in one or both inner cores, that may be used for various optical devices, such as OADMs, optical filters, Mach-Zehnder interferometers, interleavers and wavelockers.

BACKGROUND ART

The telecommunications industry is currently striving to develop an all optical reconfigurable network. This reconfigurable network will require agile wavelength control devices such as tunable or "reconfigurable" optical add/drop multiplexers (ROADMs), 2×2 couplers, optical pumps and bandpass filters. A simple ROADM utilizes a 2×2 coupler to combine distally located tunable Bragg gratings. This technology is undesireable because the insertion can exceed at least 3 dB. Alternatively, the 2×2 couplers have been substituted with optical circulators. The combination of circulators and tunable gratings provide a simpler, lower loss and flexible features than the 2×2 coupler embodiments. Unfortunately, the cost of the circulators makes this technology relatively expensive.

An alternate low loss OADM technology uses combinations of Mach-Zehnder interferometers (MZIs) and gratings structures. The fiber MZI/coupler technique requires precise control of the OPD, which is difficult to maintain with standard optical fiber interferometers in the face of the environmental perturbations typically experienced by telecom components.

Further, gratings written in the fuse region of couplers is also a viable low loss alternative to the circulator/grating configuration, but currently faces a variety of practical limitations, most of which are related to temperature stability and grating quality.

Other techniques are used to manufacture the 2×2 couplers used in telecommunications components. For example, a pair of D-shaped fiber may be fused together and then stretched to taper the cores, and therefore reduce diameter of the cores and fused portion of the coupler. A grating is then written within the tapered region of the coupler. Some disadvantages of this technology is that the couplers are sensitive to the environment such at temperature variations and vibration. The reduced diameter tapered region also makes for flexible and fragile components, resulting in increase bending loss, stability and ruggedness. Further, tuning of the grating by straining the grating is difficult.

The 2×2 couplers may also be formed using a dual core fiber. These fiber couplers exhibit similar disadvantages as the tapered couplers described hereinbefore.

It would be advantageous for provide a 2×2 coupler, ROADM or similar optical component that provides environmental stability, tunablility and manufacturability.

SUMMARY OF THE INVENTION

An object of the present invention is to provide a coupler and/or optical add/drop multiplexer, including an optical waveguide with a reflective elements disposed therein, wherein optical waveguide has characteristic that provide a more rugged and tunable optical component.

In accordance with an embodiment of the present invention, an optical waveguide comprises an outer cladding and at least two cores disposed within the outer cladding. The cores are spaced apart a predetermined distance to couple light from a first core to the other core. The outer transverse dimension of the waveguide is greater than 0.3 mm.

In accordance with an embodiment of the present invention, an optical drop filter for dropping a wavelength band from an input optical signal is provided. The drop filter comprises an optical waveguide that includes an outer cladding and a pair of cores disposed within the outer cladding. The cores are spaced apart a predetermined distance to couple light from one core to the other core. An outer transverse dimension of the waveguide is greater than 0.3 mm. A grating is disposed in each core. Each grating has substantially the same reflection wavelength, wherein the reflection wavelength of each grating is substantially the same as the center wavelength of the wavelength band to be dropped.

In accordance with an embodiment of the present invention, an optical add/drop multiplexer for adding and/or dropping a wavelength band from an input optical signal is provided. The add/drop multiplexer comprises an optical waveguide that includes an outer cladding and a pair of cores disposed within the outer cladding. The cores are spaced apart a predetermined distance to couple light from one core to the other core. An outer transverse dimension of the waveguide is greater than 0.3 mm. A grating is disposed in each core. Each grating has substantially the same reflection wavelength, wherein the reflection wavelength of each grating is substantially the same as the center wavelength of the wavelength band to be dropped and/or added. The length of the waveguide is substantially equal to the coupling length.

In accordance with an embodiment of the present invention, an optical add filter for adding a wavelength band from an input optical signal is provided. The add filter comprises an optical waveguide that includes an outer cladding and a pair of cores disposed within the outer cladding. The cores are spaced apart a predetermined distance to couple light from one core to the other core. An outer transverse dimension of the waveguide is greater than 0.3 mm. A grating is disposed in each core. Each grating has substantially the same reflection wavelength, wherein the reflection wavelength of each grating is substantially the same as the center wavelength of the wavelength band to be added.

In accordance with an embodiment of the present invention, a bandpass filter for dropping a wavelength band from an input optical signal is provided. The bandpass filter comprises a first and second optical waveguide. Each of the first and second optical waveguides includes an outer cladding and a pair of cores disposed within the outer cladding. The cores are spaced apart a predetermined distance to couple light from one core to the other core. An outer transverse dimension of the waveguide is greater than 0.3 mm. A grating is disposed in each core. Each grating has substantially the same reflection wavelength, wherein the reflection wavelength of each grating is substantially the same as the center wavelength of the wavelength band to be dropped. The drop port of the first optical waveguide is optically coupled to the input port of the second optical waveguide.

In accordance with an embodiment of the present invention, an optical pump combiner for combining a first pump light centered at a first wavelength and a second different pump light centered at a second wavelength is provided. The pump combiner comprises an optical waveguide that includes an outer cladding and a pair of cores disposed within the outer cladding. The cores are spaced apart a predetermined distance to couple light from one core to the other core. The outer transverse dimension of the waveguide is greater than 0.3 mm. A grating is disposed in each core. Each grating has substantially the same reflection wavelength, wherein the reflection wavelength of each grating is substantially the same as the center wavelength of the wavelength band of one of the first and second pump lights. The length of the waveguide is substantially equal to the coupling length.

The foregoing and other objects, features and advantages of the present invention will become more apparent in light of the following detailed description of exemplary embodiments thereof.

BRIEF DESCRIPTION OF THE DRAWINGS

FIG. 19 is a schematic view of a cascaded bandpass filter comprising a pair of dual core bandpass filters similar to that of FIG. 13 in accordance with the present invention;

FIG. 20 is a schematic view of a cascaded add filter comprising a pair of dual core add filters similar to that of FIG. 13 in accordance with the present invention;

FIG. 33 is a schematic view of a dual core demodulator in accordance with the present invention;

FIG. 34 is a schematic view of another embodiment of a dual core demodulator in accordance with the present invention;

FIG. 35 is a schematic view of another embodiment of a dual core dispersion compensator in accordance with the present invention;

FIG. 36 is a plot of the chromatic dispersion characteristics of a chirped Bragg grating versus the position from one side of the grating of the dual core demodulator of FIG. 35;

FIG. 37 is a plot of the chromatic dispersion characteristics of a chirped Bragg grating versus the position from the opposite side of the grating of the dual core demodulator of FIG. 35;

FIG. 38 is a schematic view of a pump light combiner including a dual core waveguide in accordance with the present invention;

FIG. 39 is a schematic view of another embodiment of a pump light combiner including a dual core waveguide in accordance with the present invention;

BEST MODE FOR CARRYING OUT THE INVENTION

Figure 1:
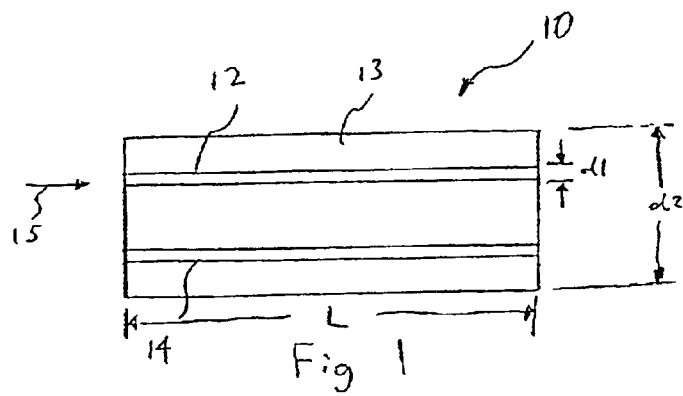
FIG. 1 is a side elevational view of a dual core waveguide wherein the cores are spaced a predetermined distance to inhibit optical coupling therebetween, according to the present invention.
Figure 2:
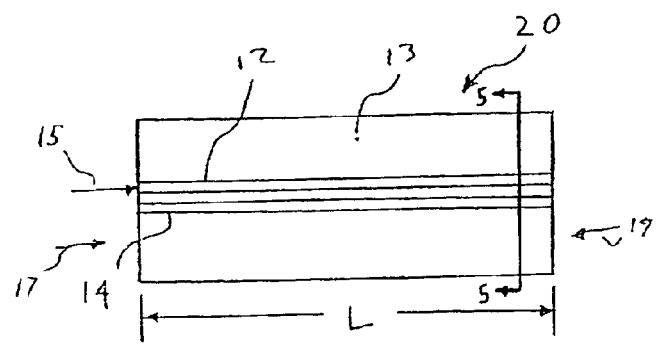
FIG. 2 is a side elevational view of a dual core waveguide wherein the cores are closely spaced to promote optical coupling therebetween, according to the present invention.

FIGS. 1 and 2 show a dual core optical waveguide, generally shown as 10 and 20 respectively, having a pair of cores 12,14 surrounded by a cladding 13, similar to that disclosed in co-pending U.S. patent application Ser. No. 09/455,868 entitled "Large Diameter Optical Waveguide, Grating, and Laser", which is incorporated herein by reference. The cores of the waveguides 10,20 are shown equally spaced and parallel to the axis of the waveguides. In FIG. 1, the cores 12,14 of the waveguide 10 are spaced a predetermined distance to prevent optical coupling of the cores. Alternatively, the cores may be closer but dissimilar to prevent evanescent coupling. While in FIG. 2, the cores 12,14 of the waveguide 20 are spaced to ensure optical coupling between the cores.

The waveguides 10,20 comprise silica glass ($SiO_2$) based material having the appropriate dopants, as is known, to allow light 15 to propagate in either direction along the cores 12,14 and/or within the waveguides. The cores 12,14 have an outer dimension d1 and the waveguide 10,20 have an outer dimension d2. Other materials for the optical waveguides 10,20 may be used if desired. For example, the waveguides 10,40 may be made of any glass, e.g., silica, phosphate glass, or other glasses; or solely plastic.

The outer dimension d2 of the cladding 13 is at least about 0.3 mm; and the outer dimension d1 of the cores 12,14 is such that they propagate in a single spatial mode or only a few spatial modes (e.g., less than about 6). For example for single spatial mode propagation, the cores 12,14 have a substantially circular transverse cross-sectional shape with a diameter d1 less than about 12.5 microns, depending on the wavelength of light. The invention will also work with larger or non-circular cores that propagate a few (less than about 6) spatial modes, in one or more transverse directions. The outer diameter d2 of the cladding 13 and the length L have values that will resist buckling when the waveguides 10,20 are placed in axial compression as indicated by the arrows 17.

The waveguides 10, 20 may be formed by using fiber drawing techniques now known or later developed that provide the resultant desired dimensions for the core and the outer diameter discussed hereinbefore. As such, the external surface of the waveguides 10,20 will likely be optically smooth, thereby allowing Bragg gratings to be written through the cladding similar to that which is done for conventional optical fiber. Because the waveguides 10,20 have a large outer diameter compared to that of a standard optical fiber (e.g., 125 microns), the waveguide may not need to be coated with a buffer and then stripped to write the gratings, thereby requiring less steps than that needed for conventional optical fiber gratings. Also, the large outer diameter d2 of the waveguides 10,20, allow the waveguides to be ground, etched or machined while retaining the mechanical strength of the waveguides. Thus, the present invention is easily manufacturable and easy to handle. Also, the waveguides 10,20 may be made in long lengths (on the order of many inches, feet, or meters) then cut to size as needed for the desired application.

Also, the waveguides 10, 20 do not exhibit mechanical degradation from surface ablation common with optical fibers under high laser fluency (or power or intensity) during grating exposure (or writing). In particular, the thickness of the cladding between the cladding outer diameter and the core outer diameter causes a reduced power level or density at the air-to-glass interface for a focused writing beam.

The waveguides 10, 20 may have end cross-sectional shapes other than circular, such as square, rectangular, elliptical, clam-shell, octagonal, multi-sided, or any other desired shapes, discussed more hereinafter. Also, the waveguides may resemble a short "block" type or a longer "cane" type geometry, depending on the length of the waveguides and outer dimension of the waveguides.

Alternatively, the optical waveguides 10,20 may be formed by heating, collapsing and fusing a glass capillary tube to a fiber (not shown) by a laser, filament, flame, etc., as is described in copending U.S. patent application Ser. No. 09/455,865, entitled "Tube-Encased Fiber Grating", which is incorporated herein by reference. Other techniques may be used for collapsing and fusing the tubes to the fiber, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

Figure 3:
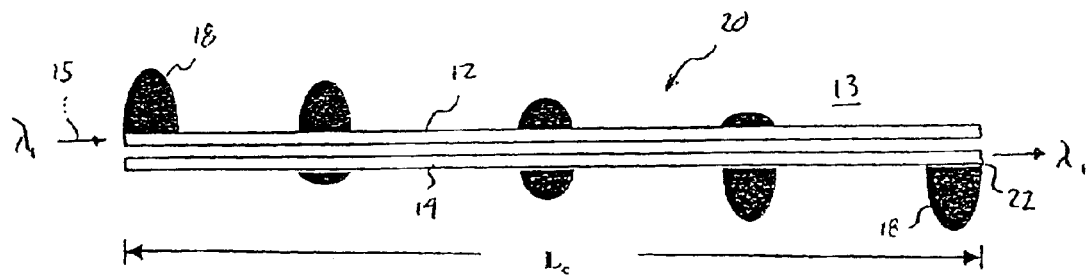
FIG. 3 is a graphical representation of the transfer of light between the pair of cores in a waveguide similar to that of FIG. 2, according to the present invention.

Referring to FIG. 3, a graphical representation of the transfer of light 15 between a pair of cores 12,14 of a waveguide 20 similar to that in FIG. 2, having a coupling length $L_c$, is shown, wherein the coupling length is defined as the length of coupled portion of the cores to transfer the maximum energy from one core to the other core. As will be described in greater detail hereinafter, the coupling length is dependent on a number of factors, namely the composition, diameter and separation of the cores 12,14. The coupling length $L_c$ is defined as the length required for a light to fully couple from a first core 12 to a second core 14, which are spaced apart a predetermined distance. The coupling length $L_c$ is also one-half of the beat length $L_b$, which is defined as the distance for complete transfer of the light from a first core 12 to the second core 14 and back.

As shown in FIG. 3, the entire energy 18 of the optical input signal 15 is in the first waveguide 12. At one-half of the coupling length $L_C$, one-half of the energy of the input signal 15 has transferred to the second core. At the coupling length, the maximum energy of the input signal 15 has transferred to the output end 22 of the second core 14.

Figure 4:
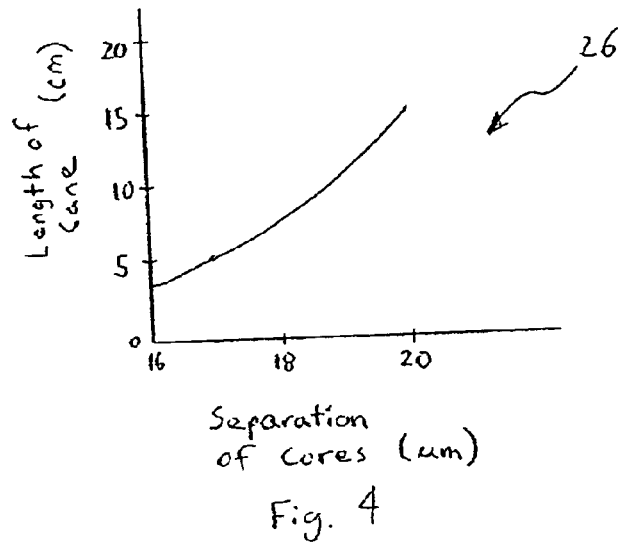
FIG. 4 is a plot showing the length of the waveguide as a function of the separation of the cores to provide complete light transfer., in accordance with the present invention.

FIG. 4 is a plot 26 showing the length of the waveguide 20 as a function of the separation of the cores 12,14. It is important to note that as the separation of the cores increases the coupling strength between the cores decreases and therefore, the length of the waveguide correspondingly increases.

Figure 5:
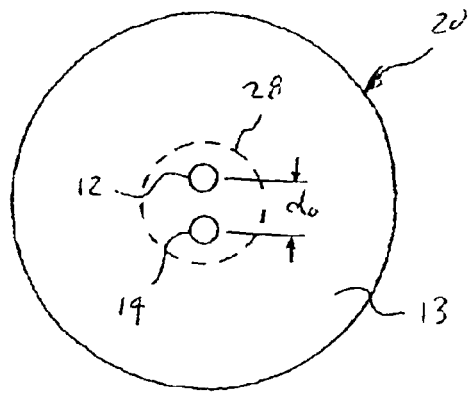
FIG. 5 is a cross-sectional view of the optical waveguide of FIG. 2 taken along the line 5—5.
Figure 6:
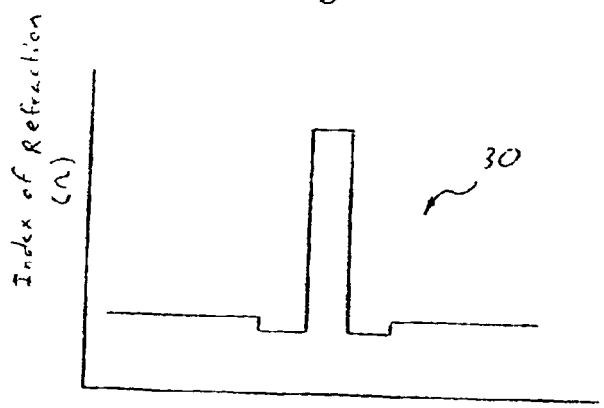
FIG. 6 is a plot of the index of refraction of the optical waveguide of FIG. 5, in accordance with the present invention.

Referring to FIG. 5, a cross-sectional view of a dual core waveguide 20 of FIG. 2 is shown. The waveguide 20 may have a depressed inner cladding that has an index of refraction less than the index of refraction of the outer clad to reduce cladding mode coupling, as shown in plot 30 of FIG. 6. Further, the index of refraction of the cores is substantially greater than the index of refraction of the outer cladding.

Figure 7:
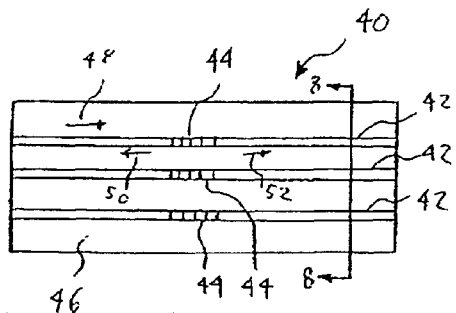
FIG. 7 is a side elevational view of a multi-core waveguide wherein the cores are spaced a predetermined distance to inhibit optical coupling therebetween, according to the present invention.

As shown in FIG. 7, the waveguide 40 similar to the waveguide 10 of FIG. 1 includes a plurality of cores 42 disposed therein that are sufficiently separated to inhibit modal cross-talk. Each core 42 has a distinct Bragg grating 44 impressed (or embedded or imprinted) therein, each of which has a different Bragg wavelength $\lambda_B$. A Bragg grating 44, as is known, is a periodic or aperiodic variation in the effective refractive index and/or effective optical absorption coefficient of an optical waveguide, such as that described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, which are hereby incorporated by reference to the extent necessary to understand the present invention. The grating 44 may be in the core 42 and/or in the cladding 46 (not shown). Any wavelength-tunable grating or reflective element embedded, etched, imprinted, or otherwise formed in the waveguide 40 may be used if desired. The waveguide 40 may be photosensitive if a grating 44 is to be written into the waveguide 40. As used herein, the term "grating" means any of such reflective elements. Further, the reflective element (or grating) 44 may be used in reflection and/or transmission of light. Light 48 incident on the grating 44 reflects a portion thereof as indicated by arrow 50 having a predetermined wavelength band of light, and passes the remaining wavelengths of the incident light (within a predetermined wavelength range), as indicated by arrow 52 (as is known).

Figure 8:
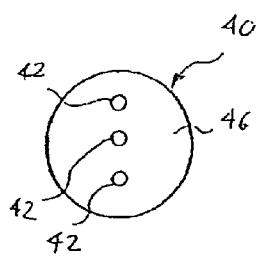
FIG. 8 is a cross-sectional view of the multi-core waveguide of FIG. 7 taken along the line 8—8.

Specifically, the waveguide of FIG. 7 has three cores 42 arranged linearly as best shown in FIG. 8. Assuming the waveguide 40 has an outer diameter of 0.8 mm and a 10 micron diameter cores, one waveguide can therefore accommodate more than ~30 cores with insignificant cross-talk. One can envision core placement arrangements that can increase the number of gratings 44 in the waveguide 40 however, based on the limitations of pigtailing or coupling light to each core 42, the number of cores is probably less than ~10 for a 0.8 mm diameter waveguide.

Preparing individual gratings with different Bragg wavelengths can be done by writing from the side and using masking techniques to isolate individual cores. Alternatively, the waveguides can be designed to have different propagation constants either by controlling the dopant concentrations or waveguide diameters. In this case, all gratings can be written in a single step using a single phase mask, but will result in different Bragg wavelengths. One can compensate for the inevitable non-uniformities in the propagation constants using uniform or apodized UV exposure to trim the respective Bragg wavelengths. As an example, a change of the Bragg wavelength ($\lambda$) of approx. 0.4 nm at 1550 nm can be achieved using a change of the index of refraction (n) of approximately $1.25 \times 10^{-4}$.

Figure 9:
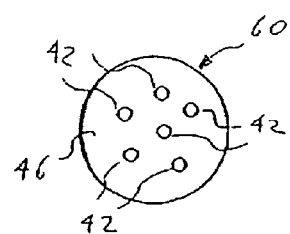
FIG. 9 is an end view of a multi-core waveguide, according to the present invention.

FIG. 9 is illustrative of another embodiment 60 of the waveguide of FIGS. 7 and 8 having six (6) cores 42 disposed therein.

The waveguides 40,60 of FIGS. 7 and 9 may be disposed within an athermal package or device similar to that shown in FIG. 49, which will be described in greater detail hereinafter, to provide multiple athermal channel filters within a single package.

Figure 10:
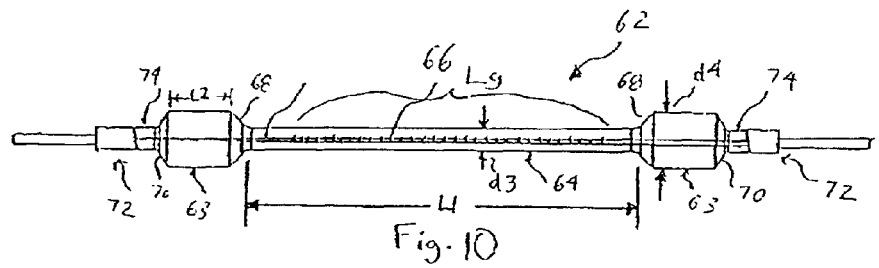
FIG. 10 is a side elevational view of another embodiment of a dual core optical waveguide in accordance with the present invention.

Further, as shown in FIG. 10, the outer surface of a dual core waveguide 62 may have a varying geometry, depending on the application. For example, the waveguide 62 may have a "dogbone" shape having a narrow central section 64 and larger outer sections 63. The dogbone shape may be used to provide increased sensitivity in converting axial force to length change $\Delta L$ and/or wavelength shift $\Delta \lambda$ of the grating (s) 66 and may be achieved by etching, grinding, machining, heating & stretching, or other known techniques.

The central section 64 may have an outer diameter d3 of about 0.8 mm, and a length L1 of about 5–20 mm. The outer sections 63 each have a diameter d4 of about 2–3 mm and a length L2 of about 2–10 mm. The overall length L1 is about 9–40 mm and the grating 66 has a length Lg of about 5–20 mm. Other lengths and diameters of the sections 63, 64 may be used. Other dimensions and lengths for the waveguide 60 and the grating may be used.

An inner transition region 68 of the outer sections 63 may be a sharp vertical or angled edge or may be curved. A curved geometry has less stress risers than a sharp edge and thus may reduce the likelihood of breakage. Further, the outer sections 63 may have tapered (or beveled) outer corners 70.

We have found that such a dimension change between the dimension d4 of the outer section 63 and the dimension d3 of the central section 64 provides increased force to grating wavelength shift sensitivity (or gain or scale factor) by strain amplification. Also, the dimensions provided herein for the dogbone are easily scalable to provide the desired amount of sensitivity.

The dimensions and geometries for any of the embodiments described herein are merely for illustrative purposes and, as such, any other dimensions may be used if desired, depending on the application, size, performance, manufacturing requirements, or other factors, in view of the teachings herein.

The angle of the beveled corners 70 is set to achieve the desired function. In addition, one or both of the axial ends of the waveguide 62 where the pigtail assembly 72 attaches may have an outer tapered (or fluted, conical, or nipple) axial section 74. The length of the axial sections is about 2.5 mm having a diameter of about 0.8 mm.

Figure 11:
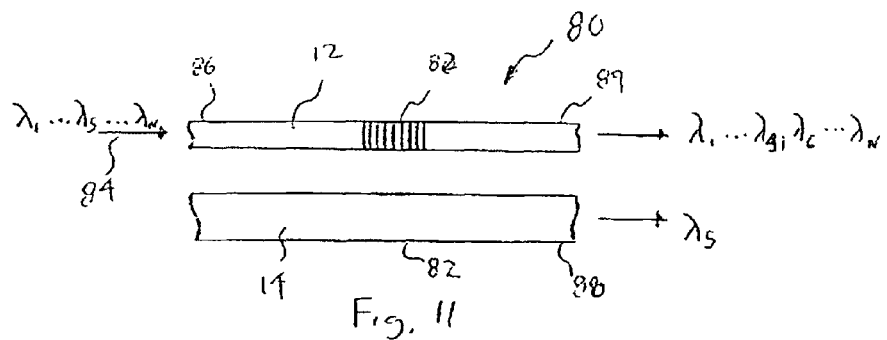
FIG. 11 is a graphical representation of a pair of cores of a dual core optical waveguide functioning as a bandpass filter based on grating-assisted coupling in accordance with the present invention.
Figure 12:
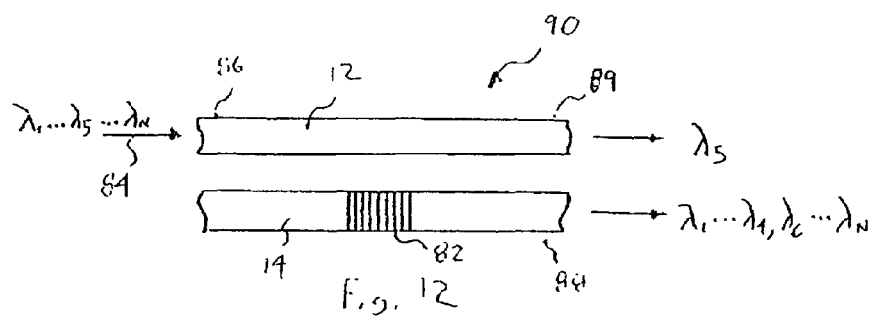
FIG. 12 is a graphical representation of a pair of cores of a dual core optical waveguide functioning as a bandpass filter based on grating-frustrated coupling in accordance with the present invention.
Figure 13:
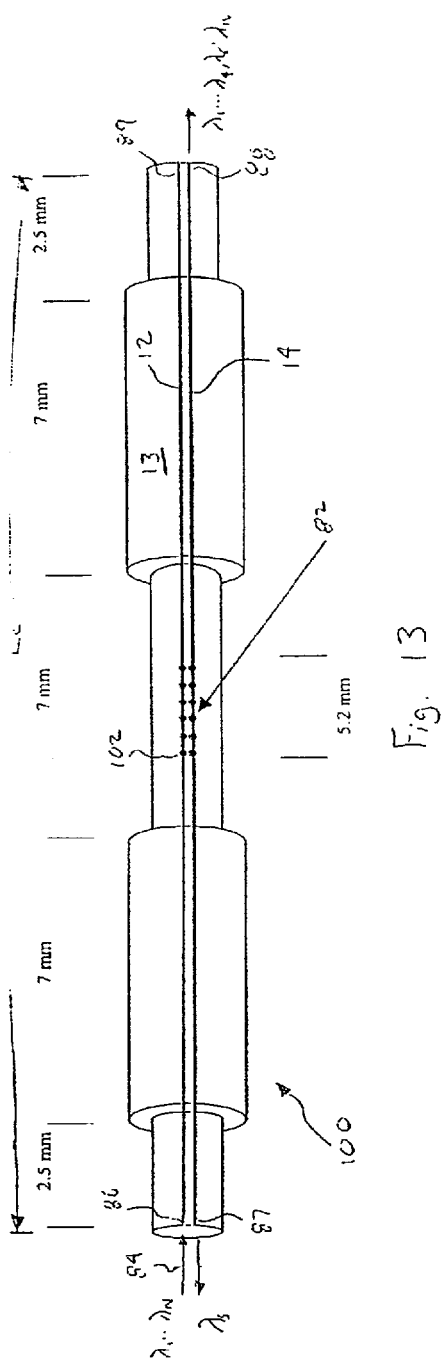
FIG. 13 is a side elevational view of dual core optical waveguide functioning as a bandpass filter in accordance with the present invention.

Referring to FIGS. 11–13, a grating 82 may be written into one and/or both cores 12,14 of a dual core coupler, similar to that shown in FIG. 2, to provide respective dual core bandpass filters 80,90,100.

For example in FIG. 11, the bandpass filter 80 is based on grating-assisted coupling of the two cores 12,14, wherein the cores are dissimilar. The grating profile is determined by the difference in the propagation constants of the two cores. The propagation of the cores 12,14 may be varied by a number of techniques, such each core having different compositions or, as shown in FIG. 11, having different diameters or cross-sectional area. A grating 82 is written in one of the cores.

In the operation of the bandpass filter 80, the WDM input signal 84 $\lambda_1$–$\lambda_N$ is provided in the input end 86 of the first core 12. The transmission of the input signal is grating-assisted and therefore, the wavelength band of light, centered at an optical channel $\lambda_5$, for example, is coupled to the second core 14 and exits from the output end 88 of the second core 14, while the remaining wavelengths $\lambda_1$–$\lambda_4$, $\lambda_6$–$\lambda_N$ continue to propagate through the first core 12 and exit from the output end 89 of the first core.

In FIG. 12, the bandpass filter 90 is based on grating-frustrated coupling of the two cores 12,14, wherein the two cores have the same propagation constants to permit coupling of all the energy of the WDM input light 84 from one core to the other core except at the "grating-frustrated" wavelength band $\lambda_5$, for example. A grating 82 is written in the second core 14, and has a reflection or Bragg wavelength at the desired frustrated-wavelength. As described hereinbefore, the length of the waveguide 90 is the same as the coupling length $L_C$.

In the operation of the bandpass filter 90, the WDM input signal 84 is provided in the input end 86 of the first core 12. The transmission of the input signal is grating-frustrated and therefore, the wavelength band of light, corresponding to the reflection wavelength of the grating $\lambda_5$, continues to propagate through the first core and exits from the output end 89 of the first core 12. The remaining wavelengths of light couple to the second core 14 and exit the output end 88 of the second core 14.

In FIG. 13, the bandpass filter 100 is based on Bragg reflecting, wherein the cores 12,14 have the same propagation constants to permit coupling of all the energy of the WDM input signal 84 from one core to the other. As shown, a Bragg grating 82 having the same reflection wavelength is written in both cores 12,14 at the substantially the same distance from the input end 86,87 of the cores. However, it is believed that the grating alignment can vary by as much as 10% of the coupling length $L_C$ and incur less than 1 dB of output loss. As noted hereinbefore, the length of the waveguide 100 is substantially equal to the coupling length, provided all the energy of the through wavelengths is desired at the output end of the second core. Generally, the grating 82 is substantially centered in the waveguide at LC/2. The grating position may be disposed to optimize the coupling strength.

In the operation of the bandpass filter 100, the WDM input signal 84 is provided in the input end 86 of the first core 12. As the input signal propagates through the core 12, the gratings reflect a wavelength band or channel centered at the reflection wavelength $\lambda_5$ of the gratings. The reflected band of light continues to couple from the first core to the second core and exits the input end 87 of the second core. The remaining wavelengths continue to propagate from the first core to the second core and exits from the output end 88 of the second core 14. One will appreciate that the length of the core can be varied to be greater than or less than the coupling length $L_C$, and thereby permit only a percentage of the remaining wavelengths to be coupled to the second core with the other percentage of the remaining wavelengths exiting the output end of the first core. Likewise, the location of the gratings in the cores may be offset from the center of the coupling length $L_C$, and thereby permit only a percentage of the reflected wavelength band to be coupled to the second core with the other percentage of the reflected wavelength band reflected back and exiting the input end of the first core.

Figure 15:
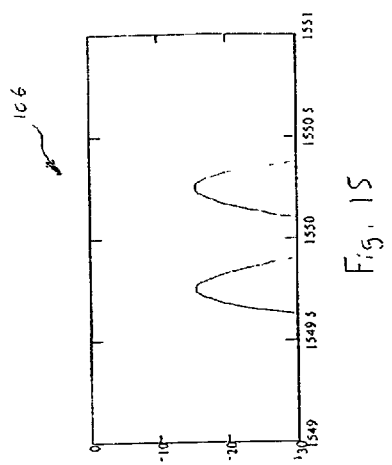
FIG. 15 is a plot of modeled data representing the residual back reflection from the other core of the optical waveguide of FIG. 13.
Figure 14:
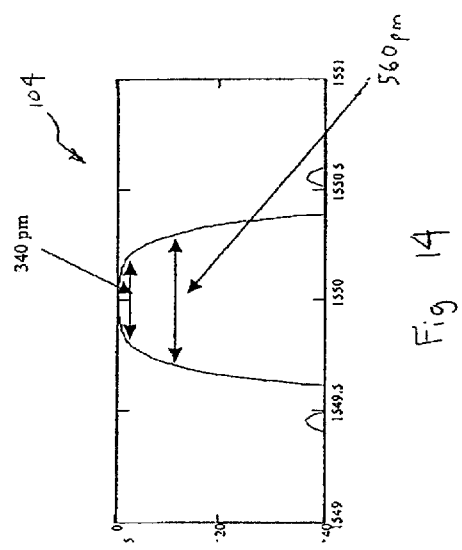
FIG. 14 is a plot of modeled data representing the reflected output signal of one core of the optical waveguide of FIG. 13.

FIGS. 14 and 15 are illustrate modeled data 104,106 representing the reflected output signal at the input end 87 of the second core 14 and the residual back reflection at the input end 86 of the first core 12 of the bandpass filter 100, respectively.

One will also appreciate that a plurality of co-located gratings or concatenated gratings may be written into the cores 12,14 to filter a plurality of wavelength bands or channels from the WDM input signal 84.

Figure 16:
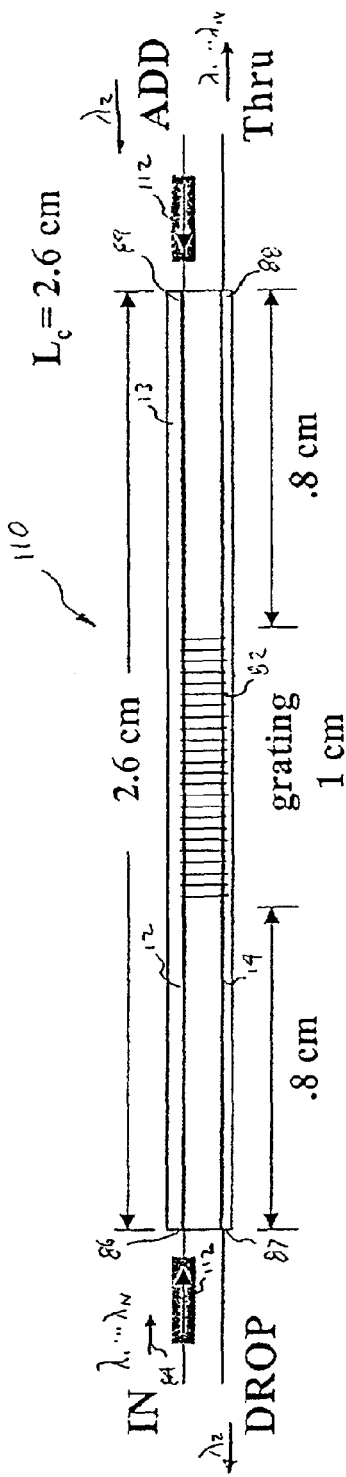
FIG. 16 is a side elevational view of dual core optical waveguide functioning as an optical add/drop multiplexer in accordance with the present invention.

Referring to FIG. 16, a graphical representation of a dual core optical add/drop multiplexer 110, similar to the bandpass filter 100 of FIG. 13, is shown. The length of waveguide is substantially equal to the coupling length $L_C$ of the input signal 84, and the grating 82 written in each core is substantially centered in the waveguide at $L_C/2$. In an exemplary embodiment for a 340 picometer (pm) dual core optical add/drop multiplexer (DCOADM) 110, the length of the waveguide is about 2.6 cm, the length Lg of the grating is about 1 cm, and the distance L1 from the ends of the waveguide to the ends of the gratings are about 0.8 cm. A pair of optical isolators 112 is provided at the ends 86,89 of the first core 12 to filter any back reflection provided by the gratings 82.

In the operation of the OADM 110, similar to the bandpass filter 100 of FIG. 13, a WDM input signal 84 is provided in the input end 86 of the first core 12. As the input signal propagates through the cores 12,14, the gratings 82 reflect a wavelength band or channel centered at the reflection wavelength $\lambda_2$, for example, of the gratings. The reflected band of light $\lambda_2$ continues to couple from the first core 12 to the second core 14 and exits the input end 87 of the second core. The remaining wavelengths continue to propagate from the first core to the second core and exits from the output end 88 of the second core. An optical add signal comprising a light waveband or channel centered at substantially the same reflection wavelength $\lambda_2$ of the gratings is provided at the output end 89 of the first core 12. As the add signal propagates through the first core, the gratings 82 reflect the add signal which continues to couple from the first core to the second core and exits the output end 88 of the second core 14, and thus added to the through signal of the input signal.

Figure 18:
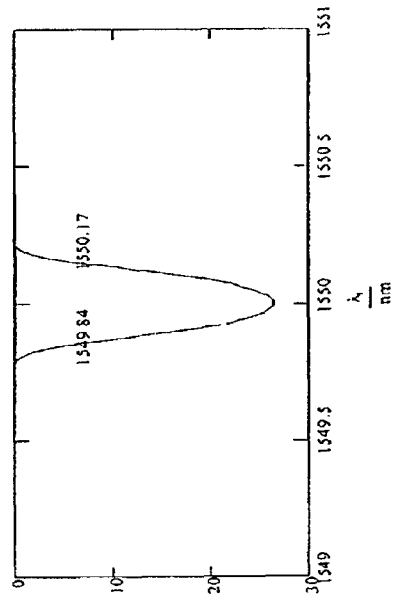
FIG. 18 is a plot of modeled data representing the through signal exiting one of the cores of the optical waveguide of FIG. 16.
Figure 17:
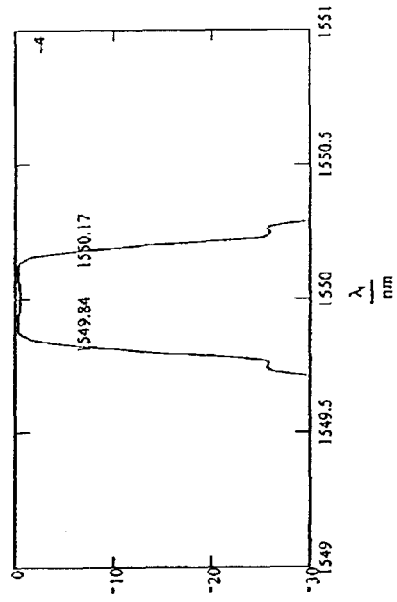
FIG. 17 is a plot of modeled data representing the add and drop signals provided to and exiting from the cores of the optical waveguide of FIG. 16.

FIGS. 17 and 18 are illustrative of modeled data 114,116 representing the add and/or drop signal provided at the output end 89 of the first core 12 and the input end 87 of the second core 14; and the through signal (with no add signal added thereto) provided at the output end 88 of the second core 14.

Referring to FIG. 19, a cascaded bandpass filter 120 is shown that comprises at least a pair of bandpass or drop filters 122,124, similar to that shown in FIG. 13, which is optically connected in series such that the through port 126 of the first drop filter 122 is optically connected to the input port 128 of the second drop filter 124. An optical isolator 129 is optically connected to the input port 132 of a first core 12 of filter 122 to block back reflection from the gratings 82. The gratings of each drop filter 122,124 has a different reflection wavelength to enable the cascaded bandpass filter 120 to sequentially drop or filter a wavelength band centered at the corresponding grating reflection wavelength. Each drop filter 122,124 substantially functions as the bandpass filter 100 of FIG. 13 described hereinbefore. The gratings 82 of the drop filters 122,124 may be offset from the center of the filter to reduce loss, so that an input end of the gratings are at a distance of about $L_C/2$ from the end of the waveguide where the wavelength is dropped. One will recognize and appreciate that offsetting the grating may be done in a similar dual core fiber configuration.

Referring to FIG. 20, a cascaded add filter 130 is shown that comprises at least a pair of add filters 132,134, similar to the OADM 110 shown in FIG. 16, which is optically connected in series such that the through port 126 of the first add filter 132 is optically connected to the input port 128 of the second add filter 134. An optical isolator 129 is optically connected to the input port 132 of the first core 12 of the first add filter 132 to block back reflection from the gratings 82. Each grating has a different reflection wavelength to enable the cascaded add filter 130 to sequentially add a wavelength band centered at the corresponding grating reflection wavelength. Each add filter 132,134 substantially functions as the add portion of the OADM 16 of FIG. 16 described hereinbefore. The gratings of the add filters may be offset from the center of the waveguide to reduce loss, so that an input end of the gratings are at a distance of about $L_C/2$ from the end of the waveguide where the wavelength is added.

Figure 21:
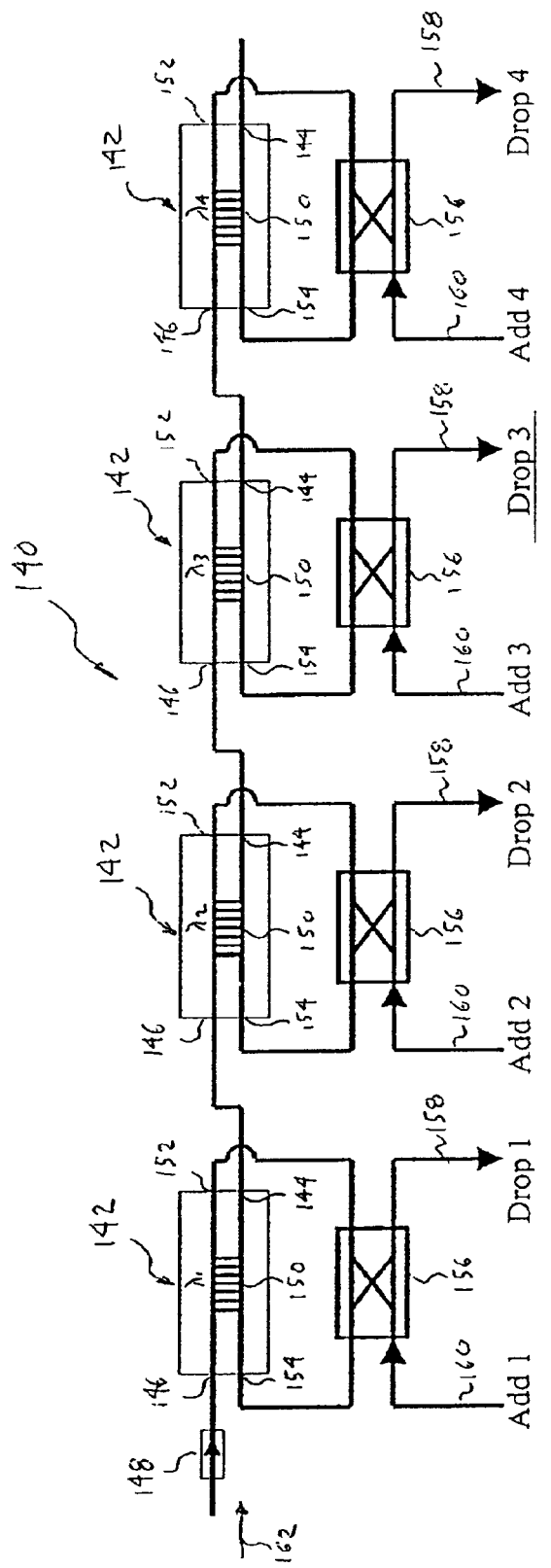
FIG. 21 is a schematic view of a multi-channel reconfigurable optical add/drop multiplexer that includes a plurality of cascaded optical add/drop multiplexers similar to that of FIG. 16 in accordance with the present invention.

FIG. 21 shows a multi-channel reconfigurable add/drop multiplexer (ROADM) 140 that includes a plurality of OADMs 142, similar to that shown in FIG. 16, optically connected in series. Specifically, the through port 144 of each OADM 142 is optically couple to the input port 146 of the subsequent OADM. An optical isolator 148 is optically connected to the input port 146 of the first add filter 150 to block back reflection from the gratings. Each grating has a different reflection wavelength $\lambda_1$–$\lambda_4$ to enable the ROADM 140 to sequentially add a wavelength band centered at the corresponding grating reflection wavelength. Each ROADM 140 substantially functions similarly as the OADM 110 of FIG. 16 described hereinbefore. For each OADM 142, the add port 152 and the drop port 154 are optically connected to cross-connect switch 156, which switch between a first and second state. In a first position, the switch 156 optical connects the drop port 154 to the drop output waveguide 158 and connects the add port 152 to the add output waveguide 160 to enable a signal to be dropped and or added to the WDM input signal having a wavelength band centered about the reflection wavelength of the corresponding wavelength. In a second position, the switch optically connects the drop port 154 to the add port 152 of the OADM 142, and therefore, the OADM adds the same signal that it just dropped back to the input signal 162. This effectively deactivates or bypasses that OADM 142 without having to tune and park the grating.

Figure 22:
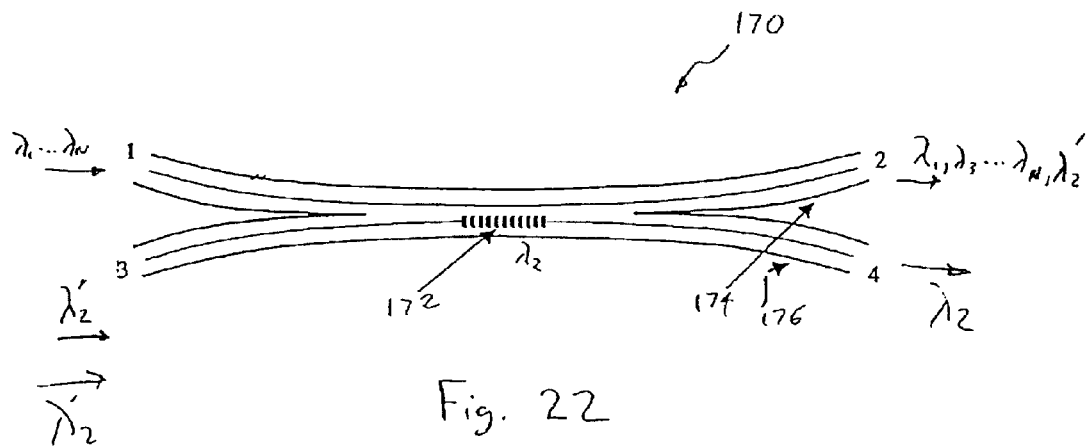
FIG. 22 is a side elevational view of an optical add/drop multiplexer based on the use of a grating-frustrated coupler in accordance with the present invention.
Figure 23:
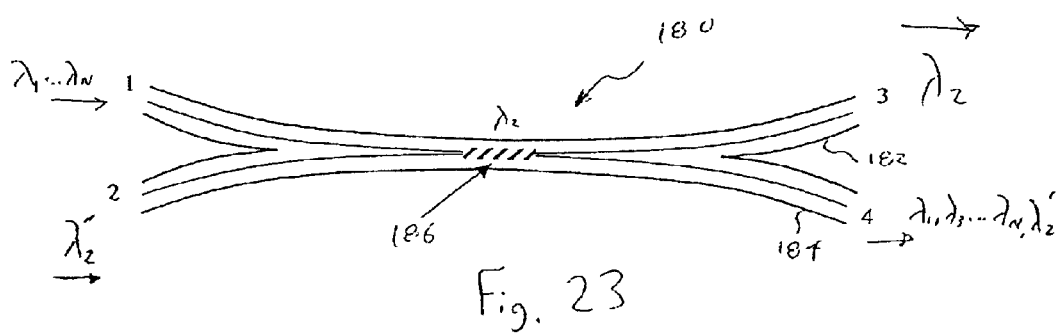
FIG. 23 is a side elevational view of an optical add/drop multiplexer based on the use of a grating-assisted coupler in accordance with the present invention.

FIGS. 22 and 23 are illustrative of optical add/drop multiplexers (OADMs) 170,180 based on the use of a grating-assisted coupler and the use of a grating frustrated coupler, respectively, as is known in the art. Referring to FIG. 22, a grating 172 is written into one core of the fused tapered region of a mismatched coupler. The OADM 170 functions similarly to the assisted coupler bandpass filter 80 of FIG. 11. In other words, the OADM will act as two independent waveguides 174,176 due to the strong mismatch of the two cores for all wavelengths other than at the reflection wavelength of the grating (i.e. light input into port 1 will exit port 2 and light entering port 3 will exit port 4). However, when the wavelength of light entering port 1 resonates in the grating and matches the propagation constants of the guided fundamental mode of the two cores, a cross coupling will occur which will transfer the optical power from one optical core to a propagating mode in the other core. As a result, the optical power from one optical core to a propagating mode in the other core. As a result other optical frequencies which match the condition injected into port 1 will be transmitted out port 4, serving to drop this particular channel in a WDM system. Other frequencies will pass unaffected out port 2. Similarly, the channel injected into port 3 at the grating wavelength will couple over to exit of port 2, serving the channel adding function, while channels at the other wavelengths will exit from port 4.

Figure 24:
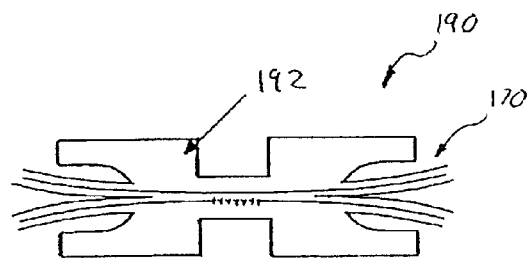
FIG. 24 is a cross sectional view of another embodiment of an optical add/drop multiplexer similar to that of FIG. 22 in accordance with the present invention.

The OADM 170 can be manufactured though methods such as adiabatic tapering and fusing of two (2) separate single mode fibers 174,176, or simple tapering of a twin core fiber. Referring to FIG. 24, once the device has been formed, a glass tube 192 can be placed over the interaction region and fused over the device 170, as described hereinbefore, (additional materials may be deposited on the element before the addition of the glass piece to prevent the tube from disturbing the interaction described above). In so doing, a large diameter waveguide 190 is formed which can be easily compressed and may be formed in the "dogbone" shape to assist in tuning the grating. By placing this device in compression, the center wavelength of the grating can be altered, and therefore, change the optical frequencies which will interact in the device.

As shown in FIG. 23, a similarly functioning OADM 180 can be formed again by adiabatic tapering and fusing of two fibers 182,184, however, this OADM is based on grating frustrated mode conversion. The OADM has includes two similar waveguides that are fused together such that optical signals injected into ports 1 and 2 couple from one core to the other core and exit by way of the opposite fibers. The OADM 180 functions similarly to the frustrated coupler bandpass filter 90 of FIG. 12. A grating 186 written transversally asymmetrically into the fused region of the device, however, can interfere causing interference between the first two eigen modes of the region and cause a conversion from one eigen mode into another. This will manifest itself as a signal entering from port 1, which has a frequency constant with the resonance of the grating and the two modal propagation constants of the two optical fibers existing from port 3. Similarly, an add signal ($\lambda'_2$) of the same frequency entering port 2 will be mode converted over and will exit port 4. Optical signals that do not meet the resonance requirements will be coupled to the opposite core. For instance, signals ($\lambda_1, \lambda_B - \lambda_N$) that enter at input port 1, which are not at the resonance of the grating, coupler over to the opposite core and exits from port 4. In much the same way as above, this device then will function as an optical add/drop multiplexer. Similar as that described hereinbefore in reference to FIG. 24, a glass tube can be placed over the interaction region and fused over the device, as described hereinbefore, (additional materials may be deposited on the element before the addition of the glass piece to prevent the tube from disturbing the interaction described above). In so doing, a large diameter waveguide is formed which can be easily compressed and may be formed in the "dogbone" shape to assist in tuning the grating. Compression of the tapered region will permit tuning of the FBG and adjustment of the optical frequency, which is affected in the device.

Figure 25:
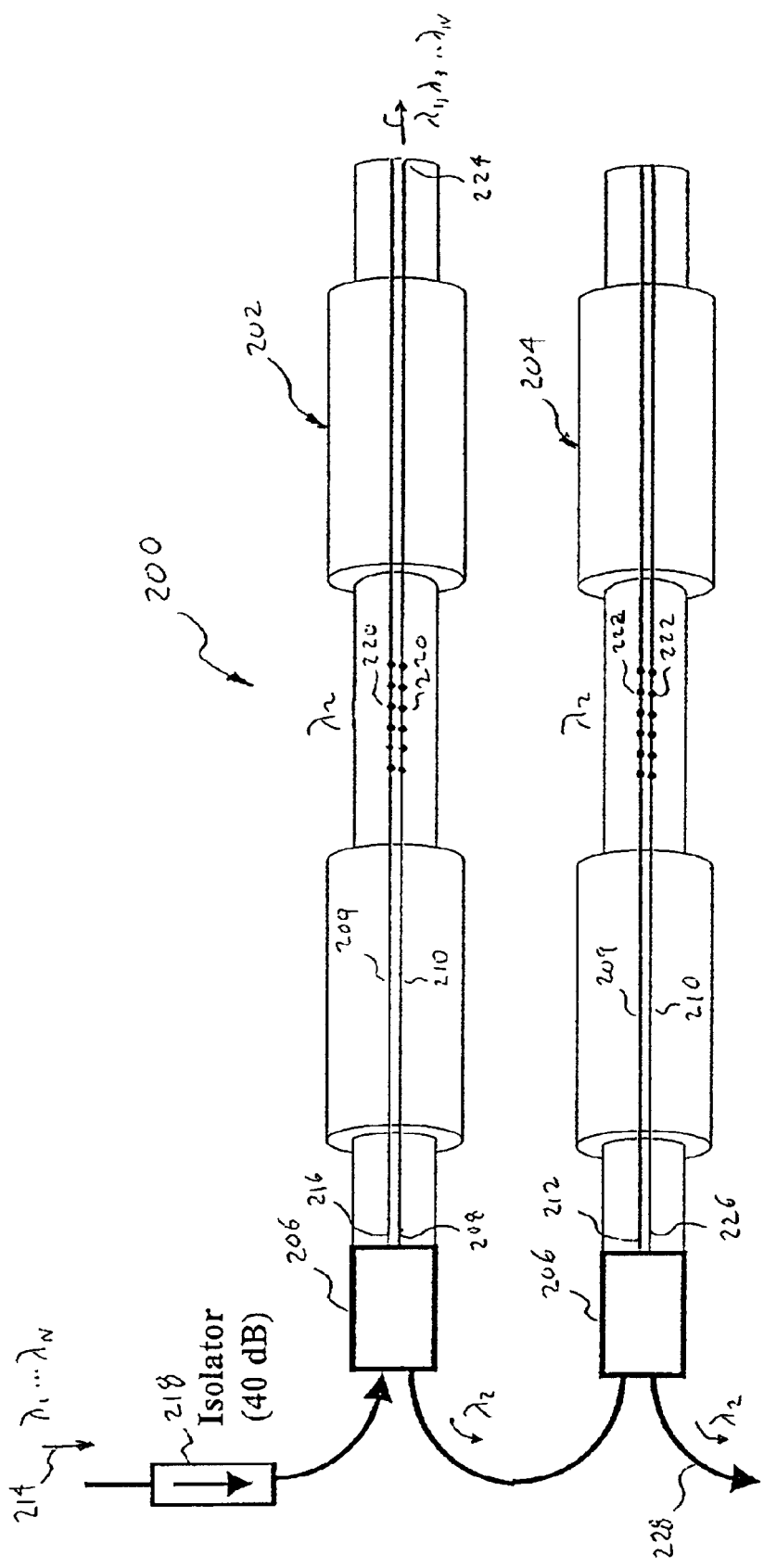
FIG. 25 is a schematic view of a bandpass filter that includes a pair of drop filters similar to that of FIG. 13 in accordance with the present invention.

Referring to FIG. 25, a bandpass filter 200 includes a pair of drop filters 202,204 (or bandpass filters) similar to that shown in FIG. 13. A pair of pigtail assemblies 206 optically connects the input end 208 of the second core 210 of a first drop filter 202 to the input end of the first core 209 of the second filter 204. A DWM input signal 214 is provided to the input end 216 of the first core 209 through an optical isolator 218 to suppress back reflection from the first drop filter 202. In one embodiment, the Bragg gratings 220,222 in each drop filter 202,204 have substantially the same reflection wavelength, similar to the configuration shown in U.S. Pat. No. 5,459,801 to Snitzer entitled "Coupler Used to Fabricate Add-Drop Devices, Dispersion Compensators, Amplifiers, Oscillators, Superluminescent Devices, and Communications Systems", which is incorporated herein by reference. In operation, the first drop filter 202 filters or reflects a wavelength band (centered at the reflection wavelength of the grating) from the input signal 214, and passes the remaining wavelengths to the output end 224 of the second core 210 of the first drop filter 202. The reflected wavelength band is reflected a second time through the input end 226 of the second core 210 of the second drop filter 204 to the output waveguide 228.

In another embodiment, the reflection wavelengths of the gratings 220,222, which may have similar or different filter functions, may be slightly off set such that the filter functions overlap a desired amount to create a desired overall filter function shape of the bandpass filter, similar to that described in U.S. patent application Ser. No. 09/648,525 entitled "Optical Filter Having a Shaped Filter Function", which is incorporated herein by reference.

Figure 49:
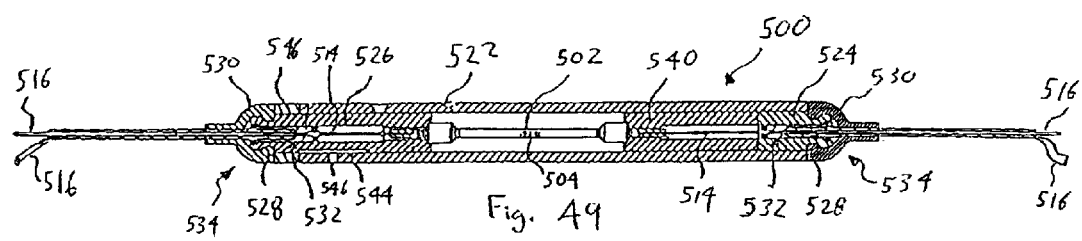
FIG. 49 is a cross sectional view of an optical athermal device including a multi-core optical waveguide in accordance with the present invention.
Figure 50:
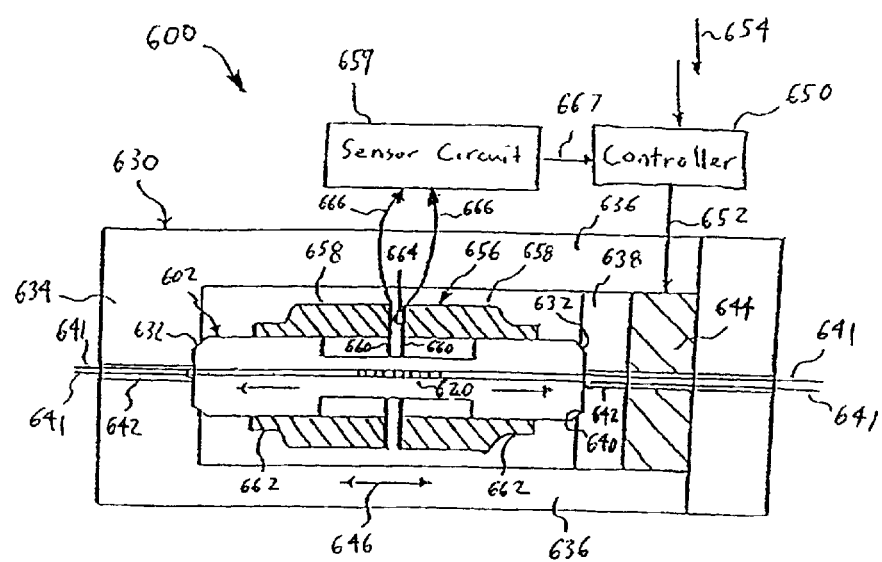
FIG. 50 is a cross sectional view of an optical tuning device for tuning a multi-core optical waveguide in accordance with the present invention.

One will appreciate that any one of these embodiments of the bandpass filter may be tunable using an athermal package or tuning device as shown in FIGS. 49 and 50, as described in detail hereinafter.

In another embodiment of the bandpass filter of FIG. 25, the drop filters may be tuned using the tuning device shown in FIG. 50, similar to that described in U.S. patent application Ser. No. 09/751,589 entitled "Wide Range Tunable Optical Filter", which is incorporated herein by reference. Each drop filter 202,204 may include a plurality of co-located and/or concatenated gratings 220,224 spaced apart a predetermined wavelength. The gratings of each drop filter are spaced such that when any grating of each drop filters are aligned, no other gratings align. This function provides the ability to tune the bandpass filter over a wider range of wavelength than possible with a pair of drop filters having a single grating.

Figure 26:
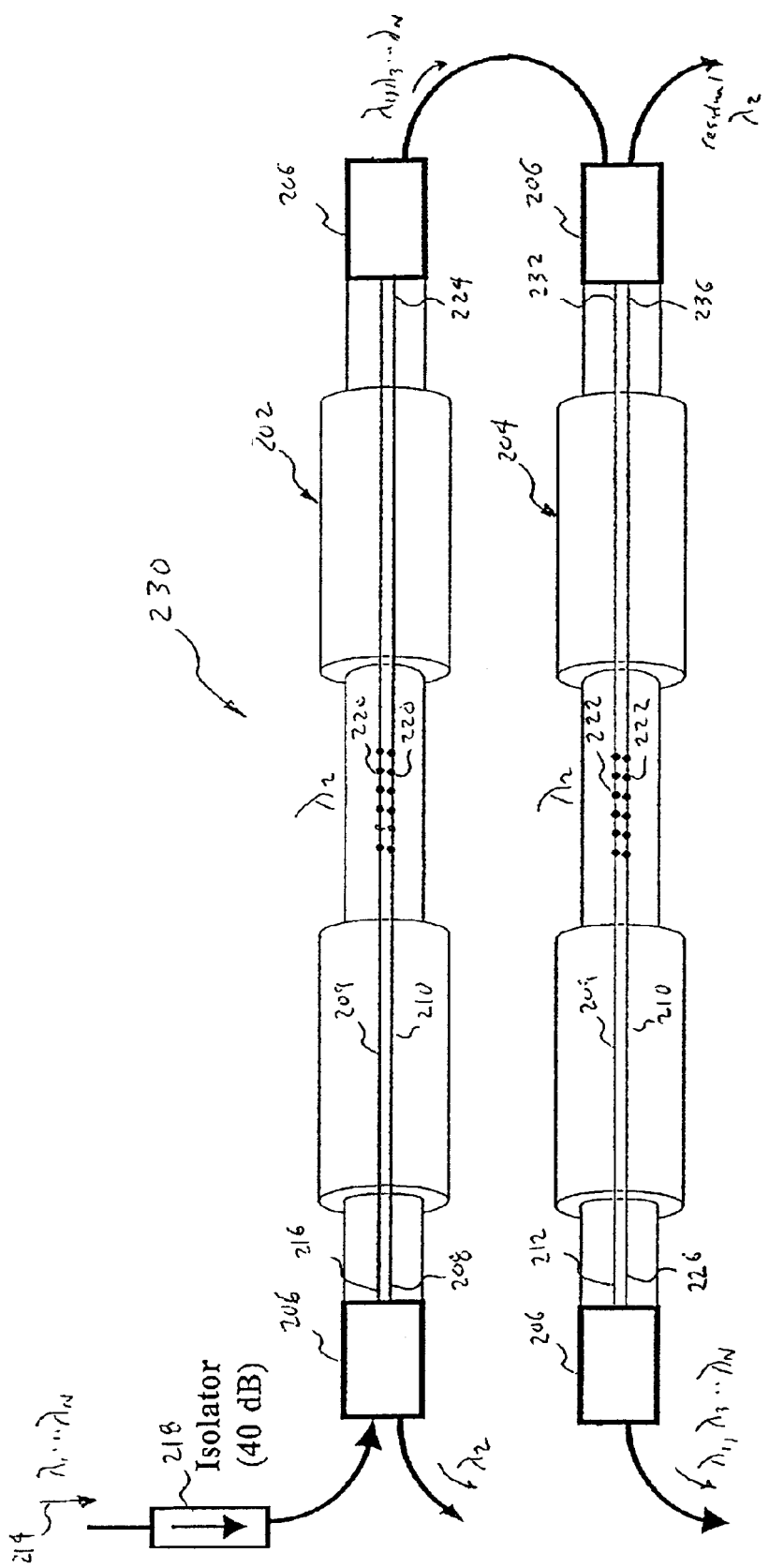
FIG. 26 is a schematic view of another embodiment of a bandpass filter that includes a pair of drop filters similar to that of FIG. 13 in accordance with the present invention.

Referring to FIG. 26, another embodiment of a bandpass filter 230 includes a pair of drop filters 202,204 (or bandpass filters) similar to that shown in FIG. 25. A pair of pigtail assemblies 206 optically connects the output end 224 of the second core 210 of the first drop filter 202 to the output end 232 of the first core 209 of the second filter 204. A DWM input signal 214 is provided to the input end 216 of the first core 209 through an optical isolator 218 to suppress back reflection from the first drop filter 202. The gratings 220,222 in each drop filter 202,204 have substantially the same reflection wavelength, similar to the configuration shown in U.S. Pat. No. 5,459,801 to Snitzer entitled "Coupler Used to Fabricate Add-Drop Devices, Dispersion Compensators, Amplifiers, Oscillators, Superluminescent Devices, and Communications Systems". In the operation, the first drop filter filters or reflects a wavelength band (centered at the reflection wavelength of the grating) from the input signal 214, and passes the remaining wavelengths to the output end 224 of the second core 210 of the first drop filter 202. The remaining wavelengths are transmitted to the output end 232 of the first core 209 of the second drop filter 204 to the grating 222 of the second drop filter. The grating 222 then reflects any residual wavelength band centered at the reflection wavelength of the grating back to the output end 236 of the second core 209, while the remaining wavelengths of light exit the input end 226 of the second core 210 of the second drop filter 204.

Figure 27:
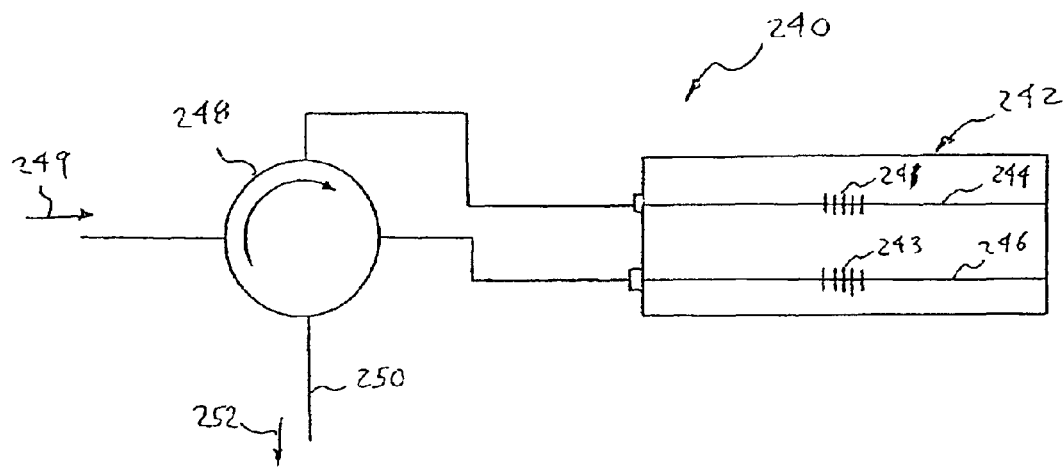
FIG. 27 is a schematic view of a chromatic dispersion compensation device including a dual core waveguide in accordance with the present invention.
Figure 28:
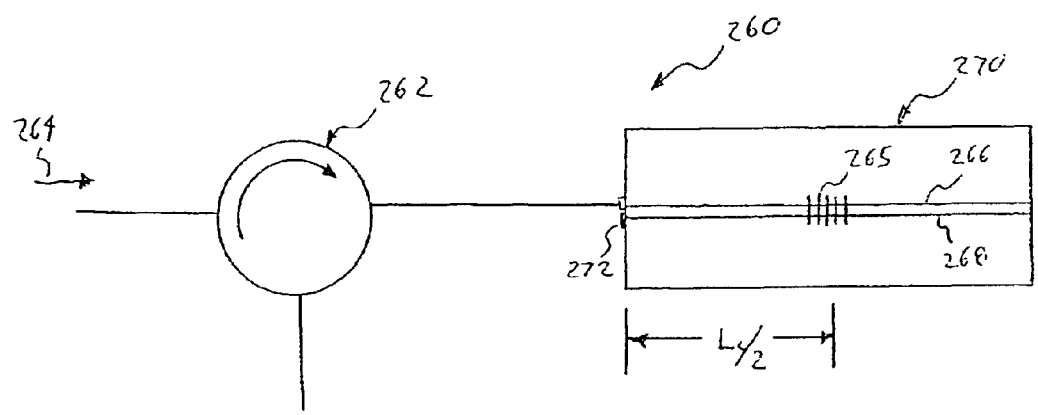
FIG. 28 is a schematic view of another embodiment of a chromatic dispersion compensation device including a dual core waveguide in accordance with the present invention.

Referring to FIGS. 27 and 28, it is well known in the art that Bragg gratings can be used to provide dispersion compensation. Typically, the grating will be chirped so that when the grating reflects a signal, the faster traveling wavelengths are required to travel a longer optical path than the slower wavelengths. If the grating is configured correctly it will exactly cancel the dispersion effects of the network and the original optical signal is restored. If the optical path the signal has taken contains a large amount of dispersion, then a very long grating is required to completely compensate, sometimes requiring a grating a meter or more in length. Alternatively, several shorter gratings can be used in succession to accomplish the same task, however this adds complexity and cost with each additional element. Regardless of the method chosen the gratings will be sensitive to temperature and strain effects, requiring that extreme care be taken to package each grating element. This can be accomplished though a strain isolating package and thermal compensation or external temperature control. This disclosure describes a dispersion compensating grating which can minimize the size and number of elements required for dispersion compensation.

FIG. 27 illustrates a dispersion compensating device 240 including a dual core waveguide 242, similar to that shown in FIG. 1, but has a chirped grating 241,243 written in each core 244,246. The two cores are separated such that they do not interact or optically couple, but the same grating can be written into each core simultaneously. As shown, a four port circulator 248 (or other light directing device such as an optical coupler or isolator) directs the optical input signal 249 into a first core 244. The first chirped grating 241 compensates the input signal for dispersion and reflects the compensated signal back to the circulator, which directs the compensated signal to the second core 246 of the dual core waveguide 242. The second chirped grating 243 further compensates the input signal for dispersion and reflects the further compensated signal back to the circulator 248, which directs the further compensated signal 252 to an output waveguide 250. This dispersion compensating device serves to achieve the compensation of a grating twice the length of one of the written gratings. In addition, more cores can be added to the overall glass structure to permit the expansion of the general concept presented here.

FIG. 28 shows an alternate approach that can achieve the same results as that described in the dispersion compensator 240 of FIG. 27, however in a simpler configuration. As shown this compensator 260 utilizes a three port circulator 262 to direct the incoming signal 264 into the Bragg grating 265 and then to direct the reflected signal out of the device. However, the dispersion compensating structure here operates on a different principle than the one previously described. In this case, the two single-mode cores 266,268 in the waveguide 270 are separated enough to prevent interaction between them except where the single Bragg grating is written, similar to that shown in FIG. 13. In this region, the optical frequencies which resonate in the dispersion compensator will be reflected and translate from the first core 266 to the second core 268.

In the operation, the circulator 262 directs the optical input signal 264 to the first core 266 of the dual core waveguide 270. The input signal is compensated for dispersion, reflected off the grating 265 and transitioned to the second core 268. The input end of the second core is coated with a reflective coating or material to form a mirror 272, which reflects the compensated signal back into the grating 265. The compensated signal is further compensated and reflected and transitioned back to the first core 266. Each reflection of the light off the Bragg grating will serve to partially compensate the dispersion of the input signal. Again, this dispersion compensator has the advantage that it effectively compensates the amount equal to a grating twice its length and is easier to package and control.

One will appreciate that any one of these embodiments of the dispersion compensators may be tunable using an athermal package or tuning device as shown in FIGS. 49 and 50, as will be described in detail hereinafter. The gratings of the waveguides may be tuned thermally or strain to change the operational wavelength range of the device. The overall dispersion compensation amount achievable by the compensator will not change, however the specific channel that the device compensates can be adjusted.

Figure 30:
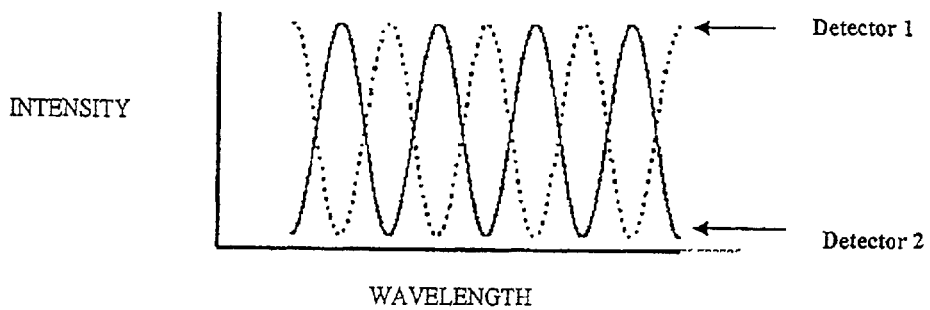
FIG. 30 is a schematic view of another embodiment of an optical wavelocker device including a dual core waveguide in accordance with the present invention.
Figure 29:
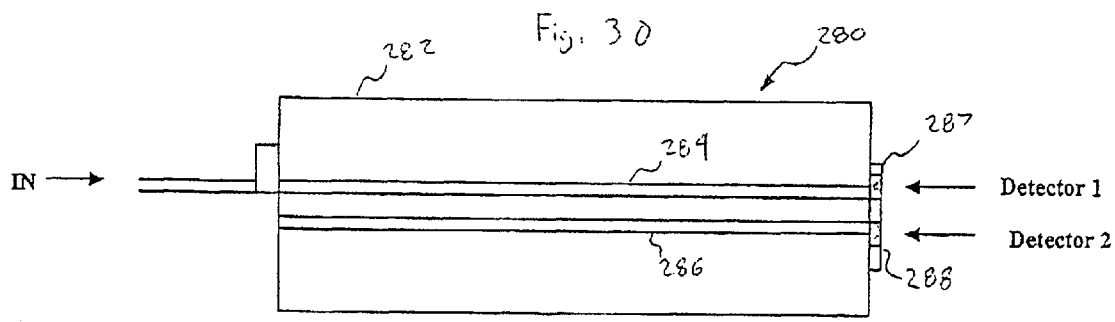
FIG. 29 is a schematic view of an optical wavelocker device including a dual core waveguide in accordance with the present invention.

As shown in FIG. 29, an optical wavelocker 280 is used to lock a laser to a particular wavelength is shown. The wavelocker includes an optical waveguide 282 similar to that shown in FIG. 2, wherein the waveguide has a pair of core 284,286 that are spaced for optical coupling light therebetween. As described hereinbefore, the coupling length depends on the wavelength of the light being coupled, the length of the waveguide, and the spacing between the cores. A pair of photodetectors 287,288 are disposed at the output end of each of the cores 284,286 to measure the intensity of the light output from each core, as shown in FIG. 30. The output light from each photodetector can them be compared to determine the error between the desired and actual wavelength propagating through the wavelocker. In one embodiment, the waveguide 282 may be design to couple one half of the input light to the second core at a desired frequency. If the input signal is at the desired wavelength, the light intensity measured by the detectors 287,288 is equal. If the input signal is offset from the desired signal, the coupling of the light will be different by the offset of the wavelength of the input signal. This difference provides a feedback signal to a tunable laser.

Figure 31:
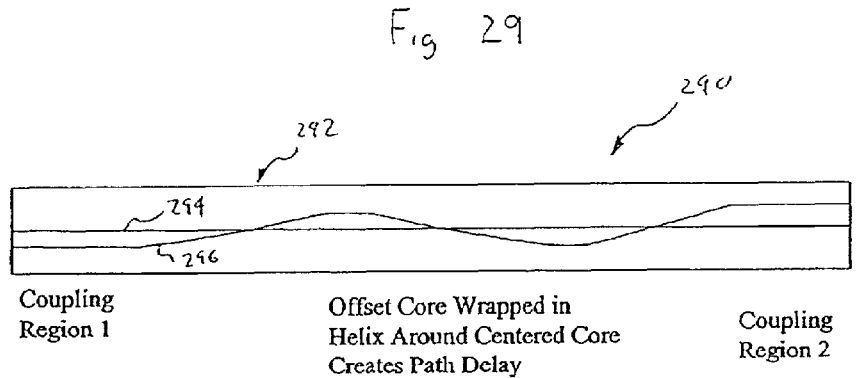
FIG. 31 is a schematic view of an optical interleaver including a dual core waveguide in accordance with the present invention.
Figure 32:
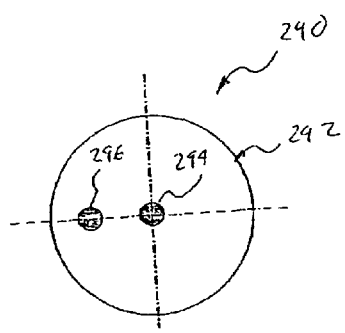
FIG. 32 is an end view of the optical interleaver of FIG. 31 including a dual core waveguide in accordance with the present invention.

FIGS. 31 and 32 show an optical interleaver formed from a large diameter dual core waveguide 292, similar to that shown in FIG. 2. The dual core waveguide uses a Mach-Zehnder interferometer as the interleaver. For such an interleaver to be a useful device, it must be able to interleave WDM channels with a wavelength spacing of 200 GHz, 100 GHz, 50 GHz and possibly smaller. To do this with a dual core waveguide requires an interferometer path delay on the order of millimeters. If the cores 294,296 are close enough to provide coupling between them, it is necessary to frustrate the coupling the path-delaying region. To frustrate the coupling sufficiently, the dual core waveguide is modified to make these path delays possible and frustrate the coupling in the path-delaying region.

The cores 294,296 of the initially disposed in the waveguide 292, such that the cores are equally spaced apart, such that it is possible to achieve arbitrary coupling from one to the other simply by adjusting the interaction length. A first core 294 extends along the axis of the waveguide and the second core 296 is offset from the center by a distance substantially equal to twice the diameter of the cores, for example. A Mach-Zehnder interferometer with a path delay may be forms using the following steps. First, a dual core waveguide has a length consistent with a 50% coupler at the operating wavelength. Second, the waveguide is heated and twisted so as to helix the offset core (i.e., second core) about the central core for a length L with one complete turn every L/N. A path delay between the cores of $(L^2+(2*\pi*d*n)^2)^{0.5}$ is created, where d is the spacing between the core centers where the offset path gets longer via stretching and the core on axis is simply twisted with no length change. Furthermore, the pitch induced in the offset core 296 by the helix will cause the propagation vector of the offset core to no longer be aligned with the propagation vector of the on-center core. This will frustrate the coupling of the cores as the light traveling within them will no longer be phase matched. The small stretching of the core will also assist in frustrating the coupling. Once an appropriate path delay has been achieved via stretching the offset core, a length of straight cane can be left to provide the second coupler for the Mach-Zehnder configuration. The helix can induce a polarization rotation due to an effect known as Berry's phase. To combat this, it is proposed that the helix be wound clockwise for the first half of the proposed length and counter-clockwise for the second half of the proposed length. The change in path length would be the same, however, the polarization would rotate one way in the first half of the delay and then undo itself in the second half of the delay.

The proposed device 290 could be manufactured via making the proposed cane and taking appropriate length pieces and twisting them on a mini-glass-working lathe. Such a set-up would be similar to that used to make fused fiber couplers. That is the set-up would have a moving torch, a lathe in which the head and tail stock could be independently controlled and a means for controlling said head and tail stock and coordinating it with the torch movement in order to create the required helical structure.

While the optical interleaver is formed using a large diameter waveguide, however, one will appreciate that the optical waveguide may be a fiber.

Referring to FIG. 33, a dual core demodulator 300 permits the measurement of key grating characteristics such as that provided by a Bragg grating (BG) sensor 302. The configuration shown permits the use of a single Bragg grating 304 as a sensing element. A WDM optical input signal 306 is directed through a directing element 308 onto the Bragg grating sensor. The sensor 302 reflects a narrowband portion of the input signal, which is then directed into the demodulator 310. The Bragg grating reflected signal 312 is directly depended on the measure and of interest therefore enabling a measure of the center wavelength of the reflected signal to provide the final measurement. The demodulator receives the reflected signal and determines central wavelength of the reflected signal.

As shown in FIG. 34, the dual core demodulator 310 includes a dual core optical waveguide 314, similar to that shown in FIG. 1, wherein the two cores 316,318 are spaced with sufficient distance such that they independently act as separate single-mode waveguides. At a point along the cores, a chirped grating 320 is written into the cores, which serves to couple the optical wavelengths, which resonate in the grating between the cores, while letting the unresonant light pass unaffected. The grating 320 has a reflection filter profile 322 that that varies with wavelength as shown in FIG. 34. The slope and overall shape of the filter profile can be varied using an athermal device or a tuning device, similar to that shown in FIGS. 49 and 50, which permits the tailoring the of the range and sensitivity of the device. The input light 312 which resonates with the grating 320 is reflected and coupled to the second core 318 and is detected by a first detector 324 (e.g., a photodetector). The remaining wavelengths of light continue to propagate in the first core 316 and are detected by a second detector 326. A simple calculation (such as the difference over the sum) of the amount of light detected by the first detector versus the second detector will then give an indication of the wavelength of light detected on the grating's reflectivity-wavelength characteristics. This detected wavelength can then be used to determine the measurand of interest as it relates to the BG sensor 302.

In addition to functioning as a demodulator 310 for a sensor 302, one will appreciate that the demodulator of FIG. 34 may also function as a wavelocker, which are used to provide a feedback signal to enable a tunable laser to lock onto the correct output wavelength with the accuracy required. The wavelocker requires a single wavelength component to be present on the input. This can be accomplished by tapping a small portion of the source laser signal and directing that light into the device. The operation is substantial the same as the demodulator except the wavelocker is determined the characteristics of laser light rather than a sensor signal reflected from a BG sensor.

While the optical demodulator and wavelocker is formed using a large diameter waveguide, however, one will appreciate that the optical waveguide may be a fiber.

FIG. 35 illustrates a dual core dispersion compensator 320 that permits the use of Bragg gratings 332 as filters that has near-zero dispersion. The compensator 330 includes a dual core waveguide 334 similar to that shown in FIG. 13, wherein a chirped grating 332 is written into the cores 336,338. The cores are spaced such that they do not interact or optically couple until the input light reaches the portion of the element with the Bragg grating 332. In this region of the Bragg grating, any wavelength of light propagating in the first core that resonates in the grating is reflected and transferred to the second core 338 and exits the input end 340 of the second core. The reflected light is then directed by the way of an optical fiber coupled from the second core 338 back into the output end 342 of the first core 336. The reflected light then reflects off the grating again but in the opposite direction. The resonant portion of the twice reflected signal couples back to the second core and exits to waveguide 344. Any light is transmitted through the grating and propagating through the first core to the optical fiber and is blocked by an isolator 346.

The basic principle of the device is to compensate for any dispersion placed on the optical signal by bouncing the signal off the chirped Bragg grating from both ends of the device. FIG. 36 shows the dispersion characteristics of a chirped Bragg grating versus position from one side of the grating, and FIG. 37 shows the dispersion characteristic of the chirped Bragg grating versus position from the opposite side of the grating. Therefore, an optical signal, which is reflected by the grating 332, is dispersed in the positive direction, as shown in FIG. 36, and when the optical signal is again reflected off the grating at in opposite direction, as shown in FIG. 37, the optical signal sees a negative dispersion equal in magnitude as the grating in the positive direction.

Another benefit of compensator is that the optical signal will see a "double-bounce" off the grating, which serves to effectively square the base filter function of the grating. This can result in a very sharp filter function with a relatively short Bragg grating.

One will appreciate that the dispersion compensator 330 cannot be used to selectively pick a portion of the optical spectrum and preserve the remaining spectrum. However, the dispersion compensator can be used as a clean-up filter where only certain portion of the wavelength band is desired.

As shown in FIGS. 38 and 39, a pump light combiner 350 is shown which enables pump light $\lambda_1,\lambda_2$ at several different wavelengths to be transmitted into a single core to achieve Ramon amplification. The pump light combiner 350 comprises a dual core waveguide 352 configured as an OADM, similar to that shown in FIG. 16, wherein dual core waveguide 352 contains two similar cores 354,356 with the cores separated so that the waveguide length is equal to a coupling length. The reflection wavelength of the gratings is substantially the same as the center wavelength of the second pump light.

As discussed hereinbefore, a first pump light $\lambda_1$ provided to the input end of the first core 354 passes through the gratings 358 and substantially couples 100% to the second core 356. The second pump light $\lambda_2$ is provided to the output end of the first core and reflects off the gratings and couples to the second core. The second pump light then combines with the first pump light and exits at the output end 360 of the second core 356. As shown in FIG. 39, the pump devices 370 may be cascaded so that multiple pump wavelengths can be added. Similarly, the pump light combiner may include a plurality of co-located or concatenated Bragg gratings having different reflection wavelengths written in the cores so that multiple pump wavelengths can be added.

Figure 40:
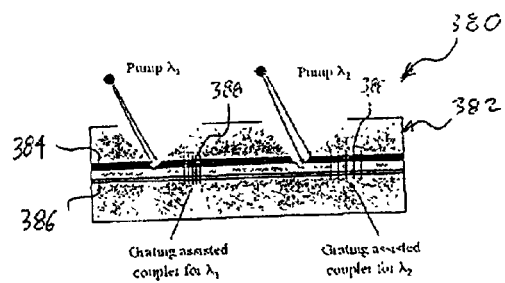
FIG. 40 is a schematic view of another embodiment of a pump light combiner including a dual core waveguide in accordance with the present invention.

In another embodiment of the pump light combiner 380 as shown in FIG. 40, a dual core waveguide 382 having dissimilar cores 384,386, similar to that shown in FIG. 11, has a grating 388 written in just one core. The grating matches the propagation constants of the two waveguides for one wavelength. So coupling occurs between the two waveguides but only for the matched wavelength. FIG. 40 shows the pump light being coupled into a first core by reflection off a notched v-groove and then coupled into the second core with the aid of the Bragg grating. These pump light combiners can be cascaded an/or multiple Bragg gratings can be written in one combiner so that multiple pumps can be added. The pump light combiner is similar to that described in U.S. patent application Ser. No. (CiDRA Docket No. CC-0245) entitled, "Method and Apparatus for Coupling Light into an Optical Waveguide" and U.S. patent application Ser. No. (CiDRA Docket No. CC-0360) entitled "Method and Apparatus for Coupling Light into an Optical Waveguide", which are incorporated herein by reference.

Figure 41:
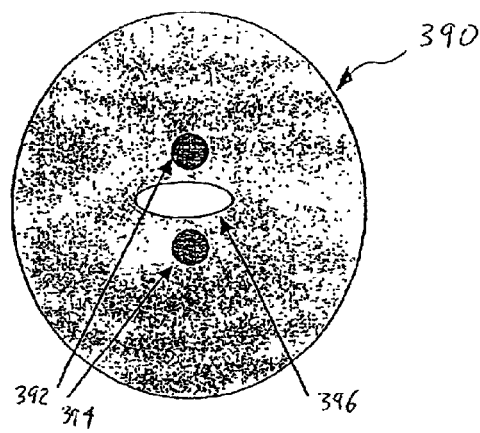
FIG. 41 is a cross sectional view of the dual core waveguide of FIG. 42.
Figure 42:
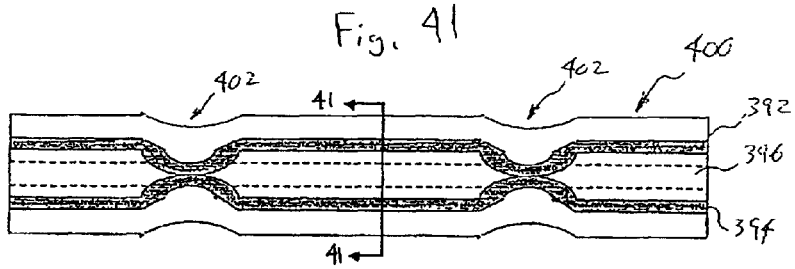
FIG. 42 is side elevational view of a dual core waveguide having hollow center portion separating the cores, in accordance with the present invention.

FIG. 41 illustrates a large diameter dual core waveguide 390 that is drawn with the cores 392,394 being separated by a hollow center 396. The hollow center prevents the two cores from interacting yet can be locally collapsed to bring the cores into close proximity in order to form a coupler, or Michelson or Mach-Zehnder interferometers 400 as shown in FIG. 42. When the waveguide is heated and the hollow center is collapsed at 402, the waveguide need not be stretched very far in order to bring the cores close enough for coupling, so the waveguide will still have a large diameter and therefore be robust. One will appreciate that a grating may be written in one or both of the legs of the interferometer.

Figure 43:
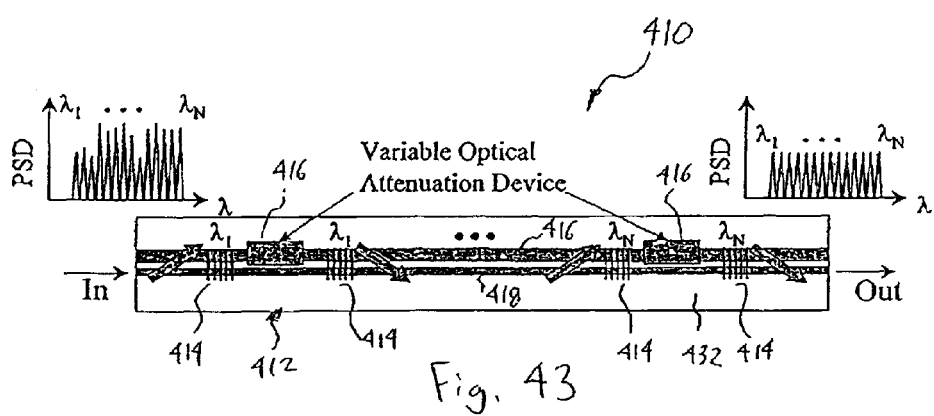
FIG. 43 is a side elevational view of a gain equalization module having a dual core waveguide in accordance with the present invention.

Referring to FIG. 43, a dynamic gain equalization module (GEM) 410 comprises a large diameter dual core waveguide 412, Bragg gratings 414, and simple attenuation mechanisms 416. The primary advantages of the present invention are: (1) very low insertion loss compared to bulk grating, MEMS, AWG, and AOTF concepts, and (2) simple components and manufacturing processes. The waveguide of the GEM includes a pair of cores 416,418 disposed in close proximity to each other to make evanescent coupling possible with the assistance of properly designed Bragg gratings. The propagation of the cores is sufficiently different to prevent evanescent coupling from occurring under normal circumstances. The propagation constants can be made different by using different doping concentrations (or materials) or using different core diameters as is illustrated in FIG. 43. Bragg gratings 414 with pitches inversely proportional to the difference in propagation constants of the two cores 416,418 can be used to couple selected wavelengths from one core to the other. With this in mind, the dynamic GEM 410 operates by selectively coupling wavelength channel 1 ($\lambda_1$) from the express port (lower core) to the upper core where it can be attenuated to the desired power level. After attenuation, the channel is coupled back into the express core. For dynamic gain equalization of the other channels propagating within the express core, separate grating pairs with independent attenuation means is needed. The requirement of two gratings and an attenuator per wavelength channel may require long lengths of dual core cane to accommodate all channels in the telecommunications band. Fortunately, segments of dual core cane can be cascaded with relatively low loss using standard optical fiber pigtails.

Note that the gratings will have relatively large pitches, thus their fundamental Bragg wavelengths (reflect backwards) will be out of the present telecommunications band.

Figure 44:
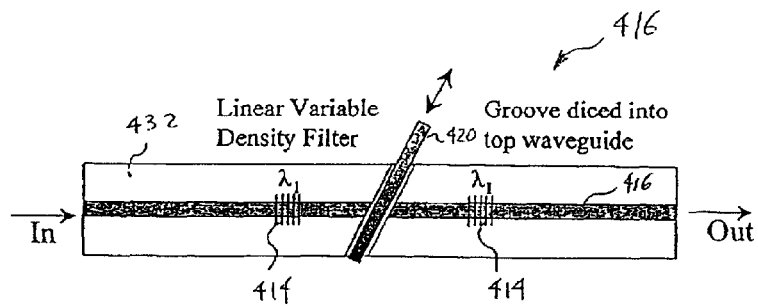
FIG. 44 is a side elevational view of an optical attenuation device in accordance with the present invention.

The attenuation device 416 can be made by a variety of means. One method is to physically cut the upper core as shown in FIG. 44. In this case, a thin groove is cut though the top core at an angle, and a linear neutral density filter 420 is inserted in such a way as to allow it to translate. Translating the linear filter using a stepper motor, or similar device, allows the attenuation of the selected wavelength to be controlled. The groove is cut at an angle and filled with index matching fluid to reduce back reflection. The index matching fluid can also serve as a lubricant.

Figure 45:
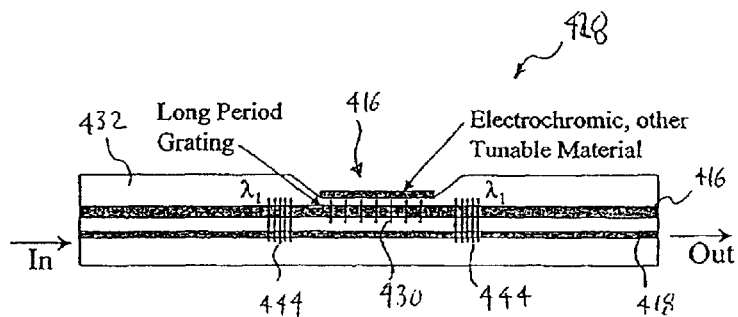
FIG. 45 is a side elevational view of another optical attenuator device in accordance with the present invention.

Another way of producing an attenuator 428 is to write a long period grating 430 in the top core 416 as shown in FIG. 45. In this case, a long period grating 430 is written or etched into the top core. This grating couples light from a forward propagating core mode to a forward propagating cladding mode. The cladding 432 is etched or polished to expose the cladding mode, which can be attenuated by introducing an attenuating material. This attenuating material can be an electrochromic, optically pumped erbium doped silica, thermo-optic polymer, etc. The control input, be it electrical or optical, is used to selectively absorb the wavelength channel coupled into the upper core. This grating can be produce using photolithographic patterning followed by HF, DRIE, etc. etching, or using standard photo-refractive methods. This grating would have been written from the side and a mask would have to be used to prevent the lower core from being exposed.

An alternate embodiment of the GEM is to couple groups of wavelengths to upper core using either over-written gratings before and after the attenuator, or using serialized gratings before and after the attenuator. This would allow blocks of channels to be equalized, instead of equalizing individual channels. Working with blocks of wavelength channels reduces the complexity and length of the invention, and while fitting in well with the all optical add/drop philosophy of the 3G network. Note that combined with static gain equalization and active gain tilting offered by optical fiber amplifiers, this latter embodiment could be a very effective means of distributed dynamic equalization of complex networks. This type of gain equalization would be a discrete device located after any OADM, but would ultimately be combined with an OADM to yield subsystem with higher functionality.

Figure 46:
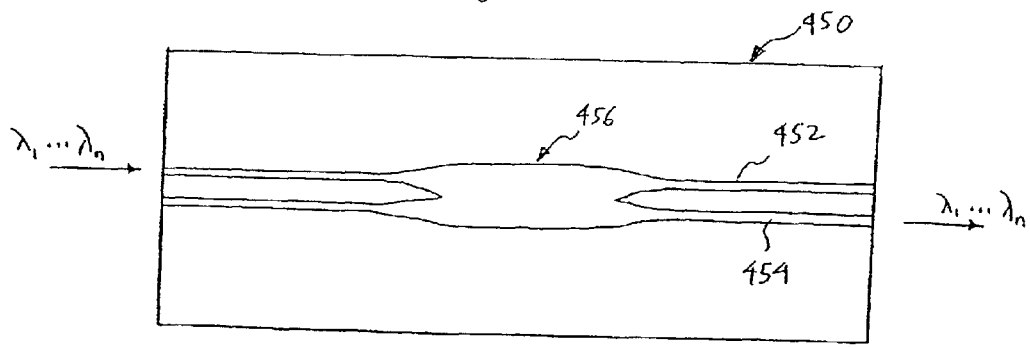
FIG. 46 is a side elevational view of an optical coupler including a thermally diffused dual core waveguide in accordance with the present invention.

As shown in FIG. 46, a dual core coupler 450 includes two adjacent cores 452,454 wherein a portion of the cores 456 is merged using thermally expanded core (TEC) techniques, as discussed in greater detail in U.S. patent application Serial No. (CiDRA Docket No. CC-0264) entitled "Thermally-Diffused Dual Core", which is incorporated herein by reference. To diffuse the cores, a localized section of the dual cores is heated with a $CO_2$ laser or other similar heating devices. Germanium in the respective cores diffuses symmetrically until the cores overlap to produce what we term as a "super core". The diffusion initially produces an elliptical super core, but eventually the super core becomes circular. Both circular and elliptical geometries are useful in the present invention. Tapers longer than 3 mm will be sufficiently adiabatic to minimize losses. Another interesting feature of the TEC diffusion techniques is that the V number remains constant (because the diameter increases at roughly the same rate as the core refractive index decreases).

The cores 452,454 of the dual core coupler 450 of FIG. 46 have different propagation constants to permit the cores to be closely spaced without evanescently coupling. The coupling region behaves much like a dual core fiber by supporting the two distinct core modes. It is also possible that more than the two lower order modes will be excited in the coupling region if the dimensions are not controlled properly. Even so, the coupling region is short enough to limit the amount of power coupled into the unwanted modes, and the lead-out cores are sufficiently long to strip unwanted modes.

Alternatively, the dual core coupler may be formed by fusing or otherwise coupling the flat surface of a pair of large diameter D-shaped waveguides, as described in copending patent application No. (CC-0441), entitled "Large Diameter D-Shaped Waveguide and Optical Coupler", which is incorporated herein by reference in its entirety.

Figure 47:
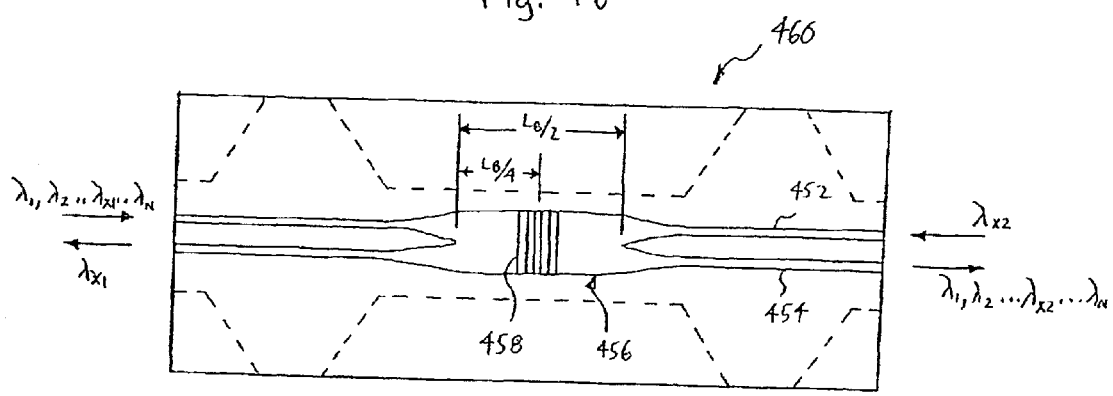
FIG. 47 is a side elevational view of an optical add/drop multiplexer including a thermally diffused dual core waveguide in accordance with the present invention.

Referring to FIG. 47, a grating 458 may be written into the core overlap region 456 of the large diameter 2×2 coupler 450 to form an OADM 460. The grating pitch designed to couple the two lowest order modes such that light satisfying the Bragg condition will couple a forward propagating fundamental mode in the input core to a backward propagating second order mode in the drop channel. The device operates similarly on the add side of the 2×2 element. Note that tiling the grating is known to aid the coupling efficiency of this type of OADM.

Alternately, the cores 452,454 of the OADM 460 of FIG. 47 may be substantially the same. The gratings in this case are more typical of the short period wavelength filters, but the length and position of the grating in the coupling region must be selected according to precise design equations, as shown previously in FIG. 16.

Figure 48:
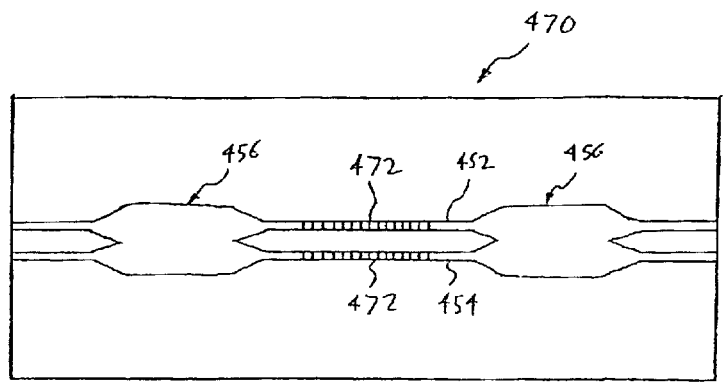
FIG. 48 is a side elevational view of a Mach-Zehnder Interferometer including a thermally diffused dual core waveguide in accordance with the present invention.

As shown in FIG. 48, two of the 2×2 couplers 450 of FIG. 4 may be combined to provide a classic Mach-Zehnder interferometer (MZI) 470. Writing identical gratings 472 into the two arms of the MZI yields an OADM. MZI OADMs require precise control of the OPD in order to be viable. This plays to the strengths of an all large diameter waveguide configuration because its geometry lends itself to high bending stiffness, thus reduced bending strain. The fact that the MZI is made from dual core cane also lends itself to precise control of the OPD. Note that the OPD can be tuned using UV exposure of one of the cores.

Alternatively, the Mach Zehnder configured to function as an interleaver by having no gratings in the arms of the MZI and properly selecting the OPD of the arms as is know in the art.

FIG. 49 illustrate an athermal device 500 similar to that describe in U.S. patent application Ser. No. 09/699,940 entitled, "Temperature Compensated Optical Device", which is incorporated herein by reference. The athermal device includes the multi-core optical waveguide 502, attached pigtail assemblies 514, and a compensating spacer or rod 540, disposed in a tubular housing 522 formed of a high strength metal or metal alloy material, preferably having a low CTE that is higher than silica.

A fixed end cap 524 and an adjustable end cap 526, which are formed of similar material as the housing are welded in respective ends of the housing 522 to secure and maintain in axial alignment the optical waveguide and compensating spacer 540. Both the fixed end cap 524 and the adjustable end cap 526 extend outward from the end of the housing 522, and include a circumferential groove 528 for receiving a respective strain relief boot 530. Further, the fixed end cap 524 and the adjustable end cap 526 include a bore 532 for receiving a respective strain relief device 534 and for passing the optical fiber 516 of the pigtail assemblies 514 therethrough.

The compensating spacer or rod 540 is disposed between the fixed end cap 524 and the optical waveguide 502. The spacer 540 includes a stepped bore disposed axially for receiving the pigtail assembly 514 therethrough. The stepped bore has a diameter greater than the inner portion of the bore of the spacer to assure that no contact occurs between the spacer and the fiber during expansion and contraction of the athermal device 500.

The spacer 540 is formed of a metal or metal alloy, such as steel, stainless steel, aluminum, and high expansion alloy. The CTEs and lengths of the optical waveguide, the end caps and the spacer are selected such that the reflection wavelength of the grating 504 does not substantially change over a predetermined temperature range (i.e., 100° C.). More specifically, the length of the spacer 540 is sized to offset the upward grating wavelength shift due to temperature and the thermal expansion of the housing, waveguide and end caps. As the temperature increases, the spacer length expands faster than the optical waveguide, which shifts the grating wavelength down to balance the intrinsic wavelength shift up with increasing temperature. The length of the adjustable end cap is longer than the fixed end cap 524.

Additionally, a pair of planar surfaces 544 are ground or formed in the outer surface of the adjustable end cap 526 to maintain the adjustable end cap in a fixed rotational orientation to the housing 522 and optical waveguide 502, during adjustment and mechanical burn-in process. The planar surfaces 544 are spaced radially at a predetermined angle (e.g., 120 degrees) and extend axially a predetermined length (i.e., 0.290 in.) to permit axial movement while maintaining the adjustable end cap 526 rotationally fixed. The planar surface align with a pair of holes 546 disposed in the housing 522, which are radially spaced 120 degrees. The holes 546 in the housing 522 receive a pair of spring loaded pins (not shown), which are disposed within a collar (not shown) mounted on the outer surface of the housing during assembly. The pins extend through the holes 546 to engage the planar surfaces 544 of the adjustable end cap 526, while the collar temporarily clamps the housing to the adjustable end cap.

To complete the assembly of the athermal device 500, a ring 546, having a width substantially equal to the distance between the end of the housing 502 and the strain relief boot 530, is placed over the adjustable end cap 526. The strain relief boots 530, which are formed of a polymer (e.g., Santoprene), are then snap fit into the grooves 528 of the end caps 524,526.

Referring to FIG. 50, to provide the necessary accuracy to precisely tune the multicore optical waveguide 602, a tunable device 600 compresses axially the waveguide 602 using a non-optical closed control loop. The tuning device 600, as will be described in greater detail hereinafter, is similar to that disclosed in co-pending U.S. patent application, Ser. No. 09/707,084 entitled "Compression Tuned Bragg Grating and Laser", and copending U.S. patent application Ser. No. 09/455,868 entitled "Large Diameter Optical Waveguide, Grating, and Laser", which are incorporated herein by reference in their entirety.

The waveguide 602 is compressed axially within a housing 630 of the tuning device 600. One end of the waveguide 602 is pressed against a seat 632 in one end 634 of the housing 630. The housing also has a pair of arms (or sides) 636, which guide a movable block 638. The block 638 has a seat 640 that presses against the other end of the waveguide 602. The axial end faces of the waveguide and/or the seats on mating surfaces 632,640 may be plated with a material that reduces stresses or enhances the mating of the waveguide 602 with the seat on the mating surfaces. The ends of the housing 630 and the block 638 have a bore 642 drilled through them to allow the fiber 641 to pass therethrough. Instead of the recessed seats 632,640, the end 634 of the housing 630 and the block 638 may provide a planar surface for engaging flush with the respective ends of the waveguide.

The housing 630 may be assembled such that a pre-strain or no pre-strain exists on the waveguide 602 prior to applying any outside forces.

An actuator 644, such as a piezoelectric actuator, engages the moveable block 638, which causes the block to move as indicated by arrows 646. Accordingly, the PZT actuator 644 provides a predetermined amount of force to the moving block 638 to compress the waveguide 602, and thereby tune the grating 620 to a desired reflection wavelength. In response to control signal generated by a displacement control circuit or controller 650 via conductor 652, the PZT actuator 644 is energized to provide the appropriate compression force necessary to tune the waveguide to the desired Bragg reflection wavelength of the grating 620. The control circuit 650 adjusts the expansion and retraction of the actuator 644 in response to an input command 654 and a displacement sensor 656 that provides feedback representative of the strain or compression of the waveguide 602 to form a non-optical closed-loop control configuration. In other words, light 611 propagating through the network or device is not used to provide feedback for the tuning of the grating 620.

In one embodiment, the displacement sensor 656 includes a pair of capacitive elements 658 and a known displacement sensor circuit 659, similar to that disclosed in copending U.S. patent application Ser. No. 09/519,802 entitled, "Tunable Optical Structure Featuring Feedback Control", filed Mar. 6, 2000, which is incorporated by reference in its entirety. As shown in FIG. 50, each capacitive element 658 is generally tubular having an annular capacitive end surface 660. The capacitive elements may be formed of glass, plastic or other material. The capacitive elements 658 are mounted, such as welding or epoxy, to respective ends of the waveguide 602 at 662 such that the capacitive surfaces 660 are spaced a predetermined distance apart, for example, approximately 1–2 microns. Other spacings may be used if desired. The capacitive elements 658 may be bonded or secured using an epoxy or other adhesive compound, or fused to waveguide using a $CO_2$ laser or other heating element. The capacitive surfaces 660 are coated with a metallic coating, such as gold, to form a pair of annular capacitive plates 664. The change in capacitance depends on the change in the spacing between the capacitive plates.

Electrodes 666 are attached to the capacitive plates 664 to connect the capacitor to the displacement sensor circuit 659. The sensor circuit 659 measures the capacitance between the capacitive plates 664; and provides a sensed signal 667, indicative of the measured capacitance, to the displacement controller 650. As the waveguide 602 is strained, the gap between the parallel capacitive plates 664 will vary, thereby causing the capacitance to change correspondingly. Specifically, as the grating is compressed, the gap between the capacitive plates 664 is reduced, resulting in an increase in capacitance. The change in capacitance is inversely proportional to the change in the reflection wavelength $\lambda_b$ of the grating 620. Since the capacitive elements 658 are directly connected to the waveguide 602, the capacitive elements are passive and will not slip. One skilled in the art would be able to implement without undue experimentation, the sensor electronics circuit 659 to measure the change in capacitance between the two capacitive plates 664.

In the operation of the tuning device 600, the controller 650 receives the wavelength input signal 654, which represents the desired reflection wavelength to tune the waveguide. In response to the input signal 654 and the sensed signal 667, which is representative of the present reflection wavelength of the grating 620, the controller 650 provides a control signal 652 to the actuator 644 to increase or decrease the compression force applied to the waveguide to set the desired reflection wavelength of the grating 620. The change in applied force to the waveguide changes the spacing between the ends of the grating 620, and therefore, the spacing between the capacitive plates 664. As described above, the change in spacing of the capacitive plates 664 changes the capacitance therebetween provided to the sensor circuit 659, which provides displacement feedback to the controller 650. While the sensor circuit 659 and the controller 650 has been shown as two separate components, one would recognize that the functions of these components may be combined into a single component. One example of a closed loop actuator 644 that may be used is Model No. CM (controller) and DPT-C-M (for a cylindrical actuator) made by Queensgate, Inc. of N.Y.

Although the invention has been described with respect to using a capacitor 656 to measure the gap distance, it should be understood by those skilled in the art that other gap sensing techniques may be used, such as inductive, optical, magnetic, microwave, time-of-flight based gap sensors. Moreover, the scope of the invention is also intended to include measuring or sensing a force applied on or about the compressive element, and feeding it back to control the compression tuning of the optical structure. While the embodiment of the present invention described hereinbefore includes means to provide feedback of the displacement of a grating element 620, one should recognize that the grating units may be accurately and repeatably compressed and thus may operate in an open loop mode.

Alternatively, instead of using a piezoelectric actuator 644, the waveguide 602 may be compressed by another actuator, such as a solenoid, pneumatic force actuator, or any other device that is capable of directly or indirectly applying an axial compressive force on the waveguide. Further, a stepper motor or other type of motor whose rotation or position can be controlled may be used to compress the grating element. A mechanical linkage connects the motor, e.g., a screw drive, linear actuator, gears, and/or a cam, to the movable block 638 (or piston), which cause the block to move as indicated by arrows 646, similar to that described in pending U.S. patent application Ser. No. 09/751,589 entitled "Wide Range Tunable Optical Filter", filed Dec. 29, 2000 (CC-0274A); and U.S. patent application Ser. No. 09/752,332 entitled "Actuator Mechanism for Tuning an Optical Device", filed Dec. 29, 2000. (CC-0322), which are incorporated herein by reference. The stepper motor may be a high resolution stepper motor driven in a microstepping mode, such as that described in the aforementioned U.S. Pat. No. 5,469,520, "Compression Tuned Fiber Grating", to Morey et al, (e.g., a Melles Griot NANOMOVER), incorporated herein by reference.

Alternatively, the grating may be tuned by mechanically stressing (i.e. tension, bending) the grating elements, or varying the temperature of the grating (i.e., using a heater), such as that described in U.S. Pat. No. 5,007,705, entitled "Variable Optical Fiber Bragg Filter Arrangement", to Morey et al., which is incorporated herein by reference.

One will appreciate that all the embodiments described hereinbefore may the athermally tuned using the athermal device 500 shown in FIG. 49, and/or dynamically tuned using the tuning device 600 shown in FIG. 50.

The dimensions and geometries for any of the embodiments described herein are merely for illustrative purposes and, as much, any other dimensions may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention.

What is claimed:

1. An optical device comprising:
an optical waveguide having an outer transverse dimension greater than about 0.3 millimeter (mm), and including
an outer cladding, and
at least two cores disposed within the outer cladding, the at least two cores being spaced apart a predetermined distance to couple light from a first core to the other core; and
a tuning device for providing a compressive force on the optical waveguide to couple one or more optical signal from one core to another core.

2. The optical device of claim 1, wherein the at least two cores have an outer core dimension of less than about 12.5 microns.

3. The optical device of claim 1, wherein the at least two cores propagate light in substantially a single spatial mode.

4. The optical device of claim 1, wherein a length of the optical waveguide is greater than 3 mm and less than a buckling length for a predetermined value of said outer optical waveguide dimension and a predetermined axial compressive strain.

5. The optical device of claim 1, wherein a length of the optical waveguide is substantially the same as the coupling length to couple the maximum light from one core to the other core.

6. The optical device of claim 1, further includes an inner cladding disposed within the outer cladding and disposed around the at least two cores.

7. The optical device of claim 6, wherein the inner cladding has an index of refraction less than the index of refraction of the at least two cores and less than the refractive index of the outer cladding.

8. The optical device of claim 1, wherein at least a portion of said optical waveguide has a cylindrical shape.

9. The optical device of claim 1, wherein said core comprises a circular end cross-sectional shape.

10. The optical device of claim 1, wherein said at least two core comprises an a symmetrical cross-sectional shape.

11. The optical device of claim 1, further comprising a reflective element imparted within at least one of the at least two cores for selectively coupling at least one predetermined band of light from a first core to a second core.

12. The optical device of claim 11, wherein said reflective element comprises a Bragg grating.

13. The optical device of claim 12, wherein the Bragg grating is one of periodic, aperiodic, blazed and chirped.

14. The optical device of claim 11, wherein the at least two cores have different propagation constants to provide grating-assisted coupling therebetween.

15. The optical device according of claim 11, wherein the at least two cores have substantially the same propagation constants to provide grating-frustrated coupling therebetween.

16. The optical device of claim 1, wherein said optical waveguide has a shape that provides a predetermined sensitivity to a length of a wavelength due to a change in an axial compression force on said optical waveguide.

17. The optical device of claim 16, wherein said shape of said optical waveguide comprises a dogbone shape.

18. The optical device of claim 16, wherein the outer cladding includes a first end having a first cross section, an opposing second end having a second cross section and an intermediate section located between the first and second ends having a third cross section smaller than the first and second cross sections, and wherein the grating gain filter is imparted in the core of the optical waveguide within the intermediate section of the cladding.

19. The optical device of claim 11, wherein the tuning device tunes the reflective element in the optical waveguide by exerting an axial compression force thereon.

20. The optical device of claim 19, wherein the tuning device is responsive to temperature.

21. The optical device of claim 19, wherein the tuning device is responsive to a control signal.

22. The optical device of claim 19, wherein the tuning device includes an actuator to compress the optical waveguide in response to a control signal.

23. The optical device of claim 20, wherein the tuning device includes a spacer for compressing the optical waveguide to compensate for spectral shift of the reflective element in response to a temperature change.

24. An optical drop filter for dropping a wavelength band from an input optical signal, comprising:
an optical waveguide having an outer transverse dimension is greater than 0.3 mm, and including
an outer cladding,
a pair of cores disposed within the outer cladding, the cores being spaced apart a predetermined distance to couple light from one core to the other core, and
a grating disposed in each core, each grating having substantially the same reflection wavelength, wherein the reflection wavelength of each grating is substantially the same as a center wavelength of a wavelength band in an input optical signal to be dropped; and
a tuning device for providing a compressive force on the optical waveguide to drop the wavelength band from one core to another core.

25. The drop filter of claim 24, wherein each of the gratings is disposed approximately one-half the coupling length from an input end of the waveguide.

26. The drop filter of claim 24, wherein the propagation constant of each core is substantially the same.

27. The drop filter of claim 24, wherein each of the gratings is a Bragg grating.

28. An optical add/drop multiplexer for adding and/or dropping a wavelength band from an input optical signal, comprising:
an optical waveguide having an outer transverse dimension greater than about 0.3 mm, and including
an outer cladding,
a pair of cores disposed within the outer cladding, the cores being spaced apart a predetermined distance to couple light from one core to the other core, and
a grating disposed in each core, each grating having substantially the same reflection wavelength, wherein the reflection wavelength of each grating is substantially the same as a center wavelength of a wavelength band in an input optical signal to be dropped and/or added,
wherein the length of the waveguide is substantially equal to the coupling length; and
a tuning device for providing a compressive force on the optical waveguide to add and/or drop the wavelength band from one core to another core.

29. The add/drop multiplexer of claim 28, wherein each of the gratings is disposed approximately at the center point of the optical waveguide.

30. The add/drop multiplexer of claim 28, wherein the propagation constant of each core is substantially the same.

31. The add/drop multiplexer of claim 28, wherein each of the gratings is a Bragg grating.

32. An optical add filter for adding a wavelength band from an input optical signal, comprising:
an optical waveguide having an outer transverse dimension greater than about 0.3 mm, and including
an outer cladding,
a pair of cores disposed within the outer cladding, the cores being spaced apart a predetermined distance to couple light from one core to the other core, and
a grating disposed in each core, each grating having substantially the same reflection wavelength, wherein the reflection wavelength of each grating is substantially the same as a center wavelength of a wavelength band in an input optical signal to be added; and
a tuning device for providing a compressive force on the optical waveguide to add the wavelength band from one core to another core.

33. The add filter of claim 32, wherein each of the gratings is disposed approximately one-half the coupling length from an input end of the waveguide.

34. The add filter of claim 32, wherein the propagation constant of each core is substantially the same.

35. The add filter of claim 32, wherein each of the gratings is a Bragg grating.

36. An bandpass filter for dropping a wavelength band from an input optical signal, comprising:
a first and second optical waveguide, each of the first and second optical waveguide having an outer transverse dimension greater than about 0.3 mm, and including
an outer cladding,
a pair of cores disposed within the outer cladding, the cores being spaced apart a predetermined distance to couple light from one core to the other core, and
a grating disposed in each core, each grating having substantially the same reflection wavelength, wherein the reflection wavelength of each grating is substantially the same as a center wavelength of a wavelength band in an input optical signal to be dropped,
wherein the drop port of the first optical waveguide is optically coupled to the input port of the second optical waveguide; and
a tuning device for providing a compressive force on the optical waveguide to drop the wavelength band from one core to another core.

37. The bandpass filter of claim 36, wherein each of the gratings is disposed approximately one-half the coupling length from an input end of each respective waveguide.

38. The bandpass filter of claim 36, wherein the propagation constant of the cores of the first waveguide are substantially the same and the propagation constant of the cores of the second waveguide are substantially the same.

39. The bandpass filter of claim 36, wherein each of the gratings of the first and second waveguides is a Bragg grating.

40. The bandpass filter of claim 36, wherein the grating of the first waveguide includes a plurality of grating that are centered at different reflection wavelengths.

41. The bandpass filter of claim 40, wherein the gratings of the first waveguide are collocated.

42. The bandpass filter of claim 40, wherein the gratings of the first waveguide are concatenated.

43. The bandpass filter of claim 36, wherein the tuning device tunes the grating of at least one of the first and second optical waveguides by exerting an axial compression force on the optical waveguide.

44. An optical pump combiner for combining first pump light centered at a first wavelength and a second different pump light centered at a second wavelength, the pump combiner comprising:
an optical waveguide having an outer transverse dimension greater than about 0.3 mm, and including;
an outer cladding,
a pair of cores disposed within the outer cladding, the cores being spaced apart a predetermined distance to couple light from one core to the other core, and
a grating disposed in each core, each grating having substantially the same reflection wavelength, wherein the reflection wavelength of each grating is substantially the same as a center wavelength of a wavelength band of one of the first and second pump lights,
wherein the length of the waveguide is substantially equal to the coupling length; and
a tuning device for providing a compressive force on the optical waveguide to drop the wavelength band from one core to another core.

45. The pump combiner of claim 44, wherein each of the gratings is disposed approximately at the center point of each respective optical waveguide.

46. The pump combiner of claim 44, wherein the propagation constant of each core is substantially the same.

47. The pump combiner of claim 44, wherein each grating is a Bragg grating.

48. The pump combiner of claim 44, wherein the first pump light is provided to one end of the first core an the second pump light is provided to the other end of the first core.

* * * * *